United States Patent
Zhang et al.

(10) Patent No.: US 9,866,752 B2
(45) Date of Patent: Jan. 9, 2018

(54) SYSTEMS AND METHODS FOR PRODUCING A COMBINED VIEW FROM FISHEYE CAMERAS

(71) Applicant: QUALCOMM Incorporated, San Diego, CA (US)

(72) Inventors: Tao Zhang, Campbell, CA (US); Feng Guo, San Diego, CA (US); Ning Bi, San Diego, CA (US); Bijan Forutanpour, San Diego, CA (US); Phi Hung Nguyen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 14/954,357

(22) Filed: Nov. 30, 2015

(65) Prior Publication Data
US 2016/0360104 A1    Dec. 8, 2016

Related U.S. Application Data

(60) Provisional application No. 62/170,075, filed on Jun. 2, 2015.

(51) Int. Cl.
| | |
|---|---|
| *H04N 5/232* | (2006.01) |
| *G06T 15/20* | (2011.01) |
| *B60R 1/00* | (2006.01) |
| *H04N 5/265* | (2006.01) |

(Continued)

(52) U.S. Cl.
CPC ........... *H04N 5/23238* (2013.01); *B60R 1/00* (2013.01); *G06T 3/0062* (2013.01); *G06T 15/205* (2013.01); *H04N 5/23261* (2013.01); *H04N 5/265* (2013.01); *H04N 13/0239* (2013.01); *B60R 2300/105* (2013.01); *B60R 2300/303* (2013.01)

(58) Field of Classification Search
CPC ............ H04N 5/23238; H04N 13/0239; G06T 3/0062
See application file for complete search history.

(56) References Cited

U.S. PATENT DOCUMENTS

| | | | |
|---|---|---|---|
| 2008/0074500 A1 | 3/2008 | Chen et al. | |
| 2012/0262580 A1* | 10/2012 | Huebner | B60R 1/00 348/148 |
| 2012/0287232 A1 | 11/2012 | Natroshvili et al. | |

(Continued)

FOREIGN PATENT DOCUMENTS

| | | |
|---|---|---|
| CN | 102651131 A | 8/2012 |
| EP | 1179958 A1 | 2/2002 |
| WO | 9857292 A1 | 12/1998 |

OTHER PUBLICATIONS

International Search Report and Written Opinion—PCT/US2016/025019—ISA/EPO—Jul. 26, 2016.

(Continued)

*Primary Examiner* — Nam Pham
(74) *Attorney, Agent, or Firm* — Austin Rapp

(57) ABSTRACT

An electronic device is described. The electronic device includes a processor. The processor is configured to obtain images from a plurality of cameras. The processor is also configured to project each image to a respective 3-dimensional (3D) shape for each camera. The processor is further configured to generate a combined view from the images.

30 Claims, 23 Drawing Sheets

(51) Int. Cl.
 *H04N 13/02* (2006.01)
 *G06T 3/00* (2006.01)

(56) References Cited

U.S. PATENT DOCUMENTS

| | | |
|---|---|---|
| 2013/0100132 A1 | 4/2013 | Katayama et al. |
| 2014/0168475 A1 | 6/2014 | Corkery et al. |
| 2014/0267596 A1 | 9/2014 | Geerds |

OTHER PUBLICATIONS

Projecting Modes—Autopano, Mar. 2, 2015 (Mar. 2, 2015), XP055284908, Retrieved from the Internet: URL:http://web.archive.org/web/20150302022349/http://www.kolor.com/wiki-en/action/view/Understanding_Projecting_Modes [retrieved on Jun. 30, 2016], 4 pages.

\* cited by examiner

SYSTEMS AND METHODS FOR PRODUCING A COMBINED VIEW FROM FISHEYE CAMERAS

RELATED APPLICATION

This application is related to and claims priority to U.S. Provisional Patent Application Ser. No. 62/170,075 filed Jun. 2, 2015, for "SYSTEMS AND METHODS FOR SURROUND VIEW GENERATION FROM FISHEYE CAMERAS."

FIELD OF DISCLOSURE

The present disclosure relates generally to electronic devices. More specifically, the present disclosure relates to systems and methods for producing a combined view from fisheye cameras.

BACKGROUND

Some electronic devices (e.g., cameras, video camcorders, digital cameras, cellular phones, smart phones, computers, televisions, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, drones, smart applications, healthcare equipment, set-top boxes, etc.) capture and/or utilize images. For example, a smartphone may capture and/or process still and/or video images. The images may be processed, displayed, stored and/or transmitted. The images may portray a scene including a landscape and/or objects, for example.

In some cases, images may be distorted. For example, images may be portrayed in a way that distorts the landscape and/or objects in the image. Distortions may be particularly noticeable in some scenarios, such as when wide-angle lenses are employed. As can be observed from this discussion, systems and methods that improve wide-angle image utilization and/or processing efficiency may be beneficial.

SUMMARY

An electronic device is described. The electronic device includes a processor. The processor is configured to obtain images from a plurality of cameras. The processor is also configured to project each image to a respective 3-dimensional (3D) shape for each camera. The processor is further configured to generate a combined view from the images.

The processor may be configured to rotate at least one of the 3D shapes to approximately align a corresponding image to a direction. The processor may be configured to rotate at least one of the 3D shapes to compensate for a tilt of a corresponding camera.

The processor may be configured to project at least a portion of each 3D shape to a common 3D shape enclosing all 3D shapes associated with the cameras. The processor may be configured to project at least a portion of the common 3D shape to a common plane. The processor may be configured to project the common 3D shape from a north pole of the common 3D shape to the common plane. The common plane may be approximately parallel to ground.

The processor may be configured to align the images projected to the common plane. The processor may be configured to determine whether an alignment error exceeds a predetermined threshold.

The processor may be configured to determine at least one seam between adjacent images and trim the images to produce a combined image. The processor may be configured to project the combined image to a shape.

The cameras may be installed in a vehicle. The processor may be configured to present the combined view in the vehicle. The images may be wide-angle images and the cameras may be wide-angle cameras.

A method is also described. The method includes obtaining images from a plurality of cameras. The method also includes projecting each image to a respective 3-dimensional (3D) shape for each camera. The method additionally includes generating a combined view from the images.

A computer-program product is also described. The computer-program product includes a non-transitory tangible computer-readable medium with instructions. The instructions include code for causing an electronic device to obtain images from a plurality of cameras. The instructions also include code for causing the electronic device to project each image to a respective 3-dimensional (3D) shape for each camera. The instructions further include code for causing the electronic device to generate a combined view from the images.

An apparatus is also described. The apparatus includes means for obtaining images from a plurality of cameras. The apparatus also includes means for projecting each image to a respective 3-dimensional (3D) shape for each camera. The apparatus further includes means for generating a combined view from the images.

DETAILED DESCRIPTION

Figure 1:
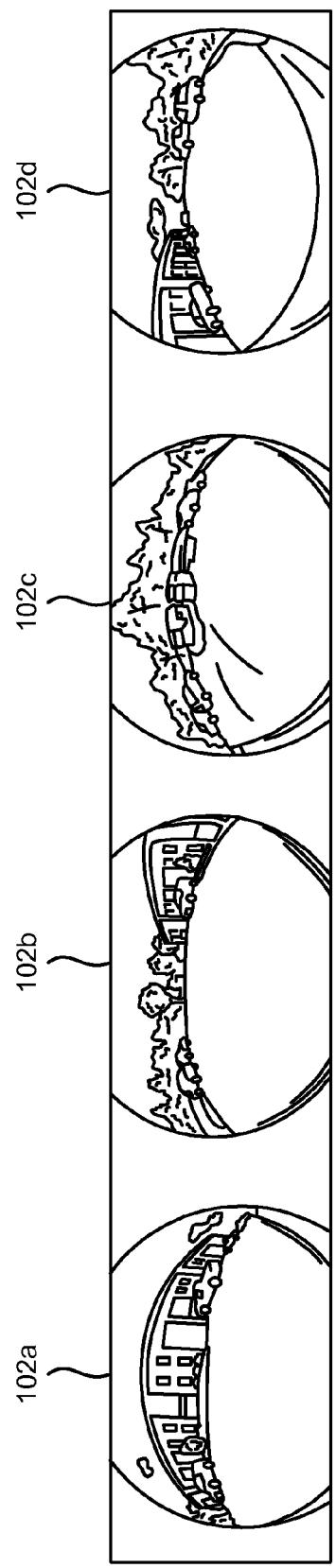
FIG. 1 illustrates an example of fisheye images captured by four fisheye cameras.

Some configurations of the systems and methods disclosed herein may provide combined view (e.g., surround view) generation from cameras. The systems and methods disclosed herein may be applied in conjunction with a variety of cameras, lenses and/or images. For example, one or more wide-angle cameras, wide field of view (FOV) cameras, fisheye cameras, normal cameras and/or long-focus (e.g., telephoto) cameras may be utilized to provide one or more wide-angle images, wide-FOV images, fisheye images, curved images, spherical images, hemispherical images, normal images, long-focus images, etc. For example, the images may be two-dimensional (2D) images with a wide-angle, wide-FOV, fisheye, curved, spherical, hemispherical, normal and/or long-focus appearance and/or properties (e.g., perspective distortion, expanded FOV, negligible or no distortion, contracted FOV, magnification, etc.). A wide-angle camera may include at least one wide-angle lens, a wide-FOV camera may include at least one wide-FOV lens, a fisheye camera may include at least one fisheye lens, a normal camera may include at least one normal lens and/or a long-focus camera may include at least one long-focus lens. Normal cameras and/or normal lenses may produce normal images, which do not appear distorted (or that have only negligible distortion). Wide-angle lenses and wide-FOV lenses (e.g., wide-angle cameras, wide-FOV cameras) may have shorter focal lengths than normal lenses and/or may produce images with an expanded field of view. Wide-angle lenses and wide-FOV lenses (e.g., wide-angle cameras, wide-FOV cameras) may produce images with perspective distortion, where the image appears curved (e.g., straight lines in a scene appear curved in an image captured with a wide-angle or wide-FOV lens). For example, wide-angle lenses and/or wide-FOV lenses may produce wide-angle images, wide-FOV images, curved images, spherical images, hemispherical images, fisheye images, etc. Long-focus lenses and/or long-focus cameras may have longer focal lengths than normal lenses and/or may produce images with a contracted field of view and/or that appear magnified.

As used herein, a "fisheye camera" may an example of a wide-angle and/or wide field-of-view (FOV) camera. For example, a fisheye camera may produce images with an angle of view between approximately 100 and 180 degrees. For instance, many fisheye lenses may have a FOV larger than 100 degrees. Some fisheye lenses have an FOV of at least 140 degrees. For example, some fisheye lenses used in the advanced driver assistance system (ADAS) context may have FOVs of 140 degrees or greater. In one configuration, a fisheye lens has an FOV of 185 degrees. Fisheye lenses may produce images that are panoramic and/or approximately spherical (e.g., hemispherical) in appearance. Fisheye cameras may generate images with large distortions. For instance, some horizontal lines in a scene captured by a fisheye camera may appear to be curved rather than straight. Accordingly, fisheye lenses may exhibit distortion and/or large FOVs in comparison with other lenses (e.g., regular cameras).

It should be noted that several examples of the systems and methods disclosed herein may be described in terms of fisheye lenses, fisheye cameras and/or fisheye images. It should be noted that the systems and methods disclosed herein may be additionally or alternatively applied in conjunction with one or more normal lenses, wide-angle lenses, wide-FOV lenses, long-focus lenses, normal cameras, wide-angle cameras, wide-FOV cameras, long-focus cameras, normal images, wide-angle images, wide-FOV images and/or long-focus images, etc. Accordingly, examples that refer to one or more "fisheye cameras," "fisheye lenses" and/or "fisheye images" may additionally or alternatively disclose other corresponding examples with normal lenses, wide-angle lenses, wide-FOV lenses, long-focus lenses, normal cameras, wide-angle cameras, wide-FOV cameras, long-focus cameras, normal images, wide-angle images, wide-FOV images and/or long-focus images, etc., instead of fisheye cameras, fisheye lenses and/or fisheye images. General references to one or more "cameras" may refer to any or all of normal cameras, wide-angle cameras, wide-FOV cameras, fisheye cameras and/or long-focus cameras, etc. General references to one or more "lenses" or "optical systems" may refer to any or all of normal lenses, wide-angle lenses, wide-FOV lenses, fisheye lenses and/or long-focus lenses, etc. General references to one or more "images" may refer to any or all of normal images, wide-angle images, wide-FOV images, fisheye images and/or long-focus images.

The systems and methods disclosed herein may be applied in many contexts, devices and/or systems. For example, the systems and methods disclosed herein may be implemented in electronic devices, vehicles, drones, cameras, computers, security systems, wearable devices (e.g., action cameras), airplanes, boats, recreational vehicles, virtual reality (VR) devices (e.g., VR headsets), augmented reality (AR) devices (e.g., AR headsets), etc.

Fisheye cameras may be installed in multiple positions. For example, four cameras may be positioned with one camera in the front, one at the left, one at the right and one at the rear part of a vehicle. Different fisheye cameras may have different tilt angles. The fisheye images from the fisheye cameras may have overlapping regions. In some configurations, more or fewer than four cameras may be installed and used for generation of the combined view (e.g., surround view) of 360 degrees or less than 360 degrees. A combined view may be a combination of images that provides a larger angle of view than each individual image alone. A surround view may be a combined view that partially or fully surrounds an object (e.g., vehicle, drone, building, etc.). In some configurations, the combined view (e.g., surround view) generated from the wide FOV cameras may be used to generate a three-dimensional (3D) combined view (e.g., surround view). How to connect the output images from multiple fisheye cameras to generate a combined view (e.g., a clear large FOV (such as 360 degree) surround view) presents a challenging problem.

Combining images may be referred to as image stitching (e.g., panorama stitching). Surround view generation may be associated with panorama stitching problems. Panorama stitching may work when images are captured by a rotating camera. Panorama stitching may be more challenging with multiple cameras (e.g., fisheye cameras) due to image distortions and a wide baseline. The distortion may be introduced by fisheye camera(s), while the wide baseline may be caused by placing cameras at different positions. In these cases, the cameras may not be modeled as a rotating camera.

One approach is to un-distort the fisheye images wholly or partially and then apply panorama stitching to the images. This approach, however, may not allow for good stitching due to the blur (e.g., blurred overlapping regions) caused by un-distortion and the difficulties caused by a wide baseline. For example, undistorted images may have blurred overlapping regions, which may be difficult to stitch successfully.

In another approach, images may be unwarped and then panorama stitching may be applied. For example, images may be unwarped to remove some distortions in the vertical direction, and then the images may be stitched. This approach may work for some camera setups, but may fail for other camera setups. For example, it may be difficult to unwarp the images to enable successful stitching. Moreover, generating the image may crop large parts of sky and ground regions. The generated image may be a strip (e.g., rectangular) image, where the first image is not connected to last image.

Another approach may be to produce a full view sphere from a fisheye camera. This approach may only work well for rotating cameras.

In accordance with the systems and methods disclosed herein, fisheye cameras may be modeled as a 3D shape (e.g., a sphere, spheroid, spherical shape, ellipsoid, polyhedron, trapezoidal prism, box, cube, rectangular prism, etc.). Multiple fisheye images generated by fisheye cameras with wide baselines may be projected into separate 3D shapes. For example, due to the wide baseline that exists between adjacent fisheye cameras, each fisheye camera may be modeled as a separate 3D shape (e.g., sphere) with different 3D locations and/or possibly different radii (which may be related to the focal length of the fisheye lens). Each of the 3D shapes may have similar tilt angles and/or may point toward each of the camera directions (e.g., forward, left, right, back, etc.). A common 3D shape enclosing the separate 3D shapes may be found. For example, each small sphere (corresponding to a separate fisheye camera, for instance) may be enclosed by a common sphere. The images on the small 3D shapes can be projected to this common 3D shape. For example, the small spheres can be projected to the common sphere. It should be noted that "common" in this context means that the common 3D shape is common to multiple 3D shapes. For example, the multiple 3D shapes may be projected to a single common 3D shape.

Without wide baseline exits, the projected image may stitch well in the common 3D shape. With a wide baseline, the image may not match well. To better align the images, a further projection (from the north pole of the common sphere, for example) to a common plane parallel to the ground may be performed. On the common ground, these images (e.g., projected images) may be aligned and stitched to get large field of view (FOV) image (e.g., combined view, surround view, etc.). Once the large-FOV image is on the common plane, optional steps may be taken to transform it to a sphere or other 3D structure to get one or more 3D effects. For example, the image on the common ground may be projected to a sphere to produce a 3D effect.

Some benefits of the systems and methods disclosed herein may include handling multiple fisheye cameras with large baselines and/or different tilt angles. The systems and methods disclosed herein may keep almost all image content (such as sky and ground) from the original fisheye images.

Some problems arise in the context of an advanced driver assistance system (ADAS). For example, an ADAS may generate a bird's-eye view, which is a view seen from above the car to the ground around the car. The bird's-eye view may generally show some good results in ground views. However, other objects above ground may be highly distorted (e.g., flattened). Some approaches may generate full-view images from fisheye images captured by a rotating camera. Again, due to the wide baseline problem, these approaches may not work well.

It should be noted that the systems and methods disclosed herein may be implemented in a vehicle and/or an advanced driver assistance system (ADAS) in some examples. While some examples of the systems and methods disclosed herein are described in terms of vehicles and/or ADAS, the systems and methods may be implemented in a variety of contexts. In an advanced driver assistance system (ADAS), multiple wide FOV cameras, such as fisheye cameras, may be installed in a vehicle (e.g., different sides of a vehicle) to allow a driver to observe surrounding scenes. For example, fisheye cameras may provide a view (to the driver, for instance) of objects on the ground and above ground.

In some examples, an automotive combined view (e.g., surround view) system may be an automotive ADAS technology that provides a driver of a vehicle a 360-degree view of the area surrounding the vehicle. Some combined view (e.g., surround view) systems may include four to six wide field-of-view (FOV) cameras, such as fisheye cameras, mounted around the vehicle. A combined view (e.g., surround view) generated from these cameras may assist the driver in real time (e.g., during parking).

FIG. 1 illustrates an example of fisheye images 102a-d captured by four fisheye cameras. For instance, the fisheye images 102a-d may be input fisheye images supplied by separate fisheye cameras. As shown in FIG. 1, the fisheye images 102a-d generated by the fisheye cameras have large distortions. For example, the building in the first fisheye image 102a appears curved.

In some configurations, the fisheye cameras may be mounted on a vehicle, where the first fisheye camera is on the right side of the vehicle, the second fisheye camera is on the front of the vehicle, the third fisheye camera is on the left side of the vehicle and the fourth fisheye camera is on the rear of the vehicle. An ADAS system with multiple fisheye cameras installed in a vehicle has a wide baseline problem because the distances between the cameras are relatively large (e.g., the front camera is installed in the front grill of a car and side cameras are installed under the side-view mirrors). Accordingly, the cameras may not be modeled as a rotating camera.

In some cases, the same object may show different facets in different fisheye images. Thus, the object may not match well between fisheye images, regardless of which linear transformations are used. An additional problem is that the fisheye cameras installed in a vehicle may have different tilt angles. For example, the front camera may be relatively tilted down, causing more ground (e.g., more content below the horizon) to be captured as illustrated in the second fisheye image 102b. However, a side camera may be relatively tilted up, causing more content above the horizon to the captured as illustrated in the first fisheye image 102a. The tilt angles may be different and may be relatively large in some cases.

In some cases, the overlapping region(s) between fisheye images may be relatively small. Additionally or alternatively, fisheye images may lack features (e.g., may have large regions of texture-less sky and/or ground) in some cases. Accordingly, combining the fisheye images may be difficult.

Figure 2:
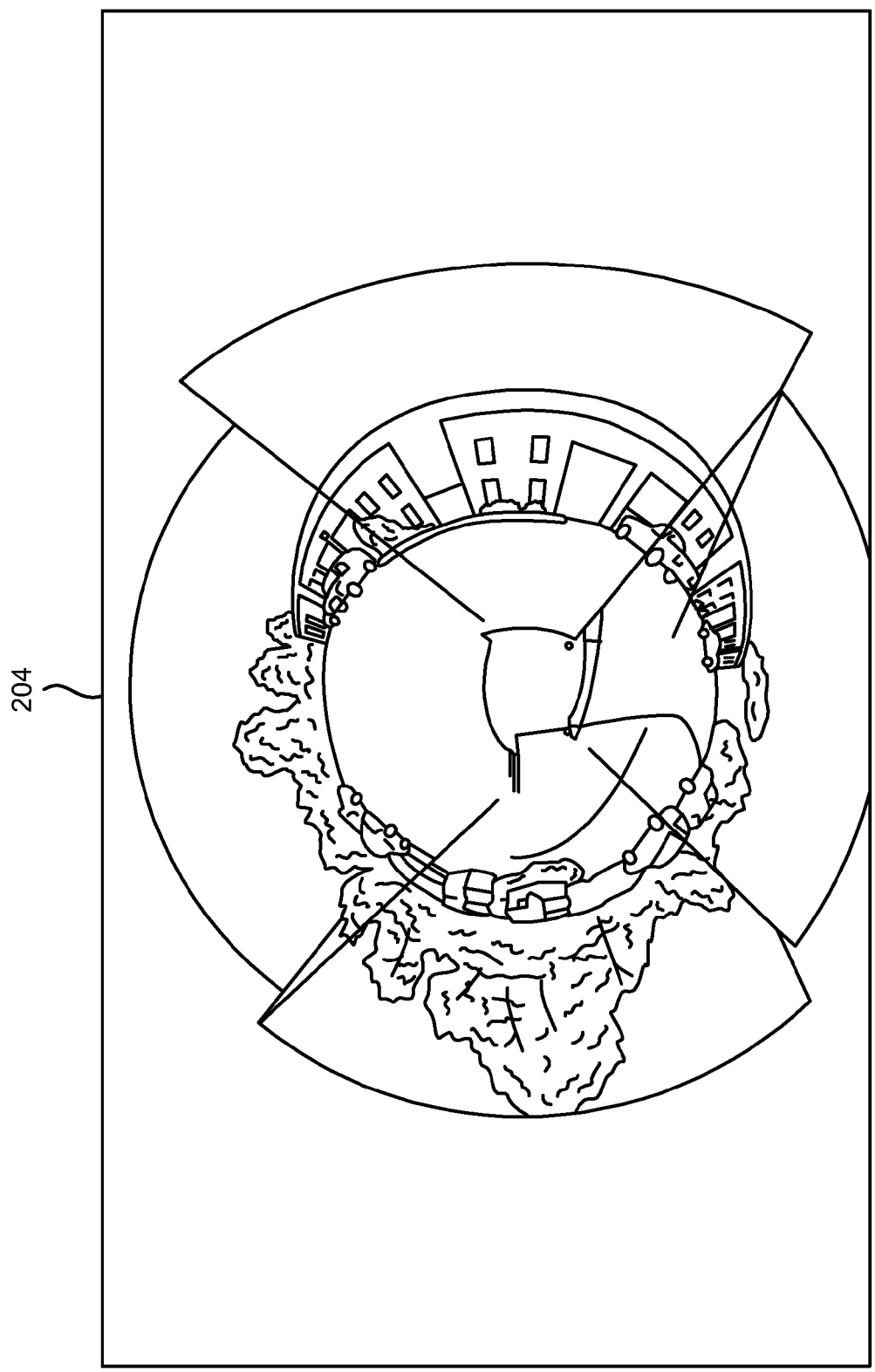
FIG. 2 illustrates one example of a combined view generated from the fisheye images in FIG. 1.

FIG. 2 illustrates one example of a combined view 204 (e.g., 360-degree surround view) generated from the fisheye images 102a-d in FIG. 1. As illustrated in FIG. 2, a view of the surroundings may be generated with multiple fisheye images in accordance with the systems and methods disclosed herein.

Figure 3:
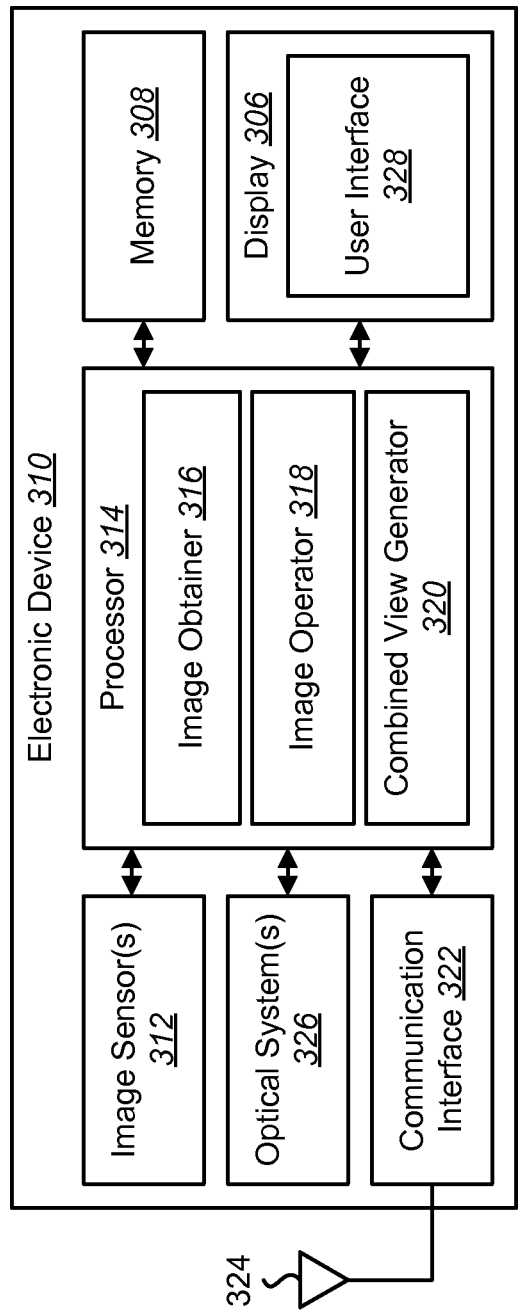
FIG. 3 is a block diagram illustrating one example of an electronic device in which systems and methods for producing a combined view may be implemented.

FIG. 3 is a block diagram illustrating one example of an electronic device 310 in which systems and methods for producing a combined view may be implemented. For instance, the electronic device 310 may be configured to generate a combined view (e.g., surround view) from fisheye cameras. Examples of the electronic device 310 include cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart applications, healthcare equipment, gaming consoles, personal digital assistants (PDAs), set-top boxes, appliances, etc. The electronic device 310 may include one or more components or elements. One or more of the components or elements may be implemented in hardware (e.g., circuitry) or a combination of hardware and software (e.g., a processor with instructions).

In some configurations, the electronic device 310 may include a processor 314, a memory 308, a display 306, one or more image sensors 312, one or more optical systems 326, and/or a communication interface 322. The processor 314 may be coupled to (e.g., in electronic communication with) the memory 308, display 306, image sensor(s) 312, optical system(s) 326, and/or communication interface 322. The processor 314 may be a general-purpose single- or multi-chip microprocessor (e.g., an ARM), a special-purpose microprocessor (e.g., a digital signal processor (DSP)), a microcontroller, a programmable gate array, etc. The processor 314 may be referred to as a central processing unit (CPU). Although just a single processor 314 is shown in the electronic device 310, in an alternative configuration, a combination of processors (e.g., an ARM and a DSP) could be used. The processor 314 may be configured to implement the methods disclosed herein, which will be explained in detail below, to produce the combined view (e.g., surround view) from the images (e.g., wide-angle images, fisheye images, etc.). In some configurations, the electronic device 310 may perform one or more of the functions, procedures, methods, steps, etc., described in connection with one or more of FIGS. 4 and 7-22.

The communication interface 322 may enable the electronic device 310 to communicate with one or more other electronic devices. For example, the communication interface 322 may provide an interface for wired and/or wireless communications. In some configurations, the communication interface 322 may be coupled to one or more antennas 324 for transmitting and/or receiving radio frequency (RF) signals. Additionally or alternatively, the communication interface 322 may enable one or more kinds of wireline (e.g., Universal Serial Bus (USB), Ethernet, etc.) communication.

In some configurations, multiple communication interfaces 322 may be implemented and/or utilized. For example, one communication interface 322 may be a cellular (e.g., 3G, Long Term Evolution (LTE), CDMA, etc.) communication interface 322, another communication interface 322 may be an Ethernet interface, another communication interface 322 may be a universal serial bus (USB) interface, and yet another communication interface 322 may be a wireless local area network (WLAN) interface (e.g., Institute of Electrical and Electronics Engineers (IEEE) 802.11 interface). In some configurations, the communication interface 322 may send information (e.g., image information, combined view information, etc.) to and/or receive information from another device (e.g., a vehicle, a smart phone, a camera, a display, a remote server, etc.). For example, the electronic device 310 may share information with a vehicle (e.g., another vehicle).

The electronic device 310 may obtain one or more images (e.g., digital images, image frames, video, etc.). For example, the electronic device 310 may include the image sensor(s) 312 and the optical system(s) 326 (e.g., lenses) that focus images of scene(s) and/or object(s) that are located within the field of view of the optical system 326 onto the image sensor 312. A camera (e.g., a visual spectrum camera) may include at least one image sensor and at least one optical system (e.g., lens). Accordingly, the electronic device 310 may be one or more cameras and/or may include one or more cameras in some implementations. In some configurations, the image sensor(s) 312 may capture the one or more images. The optical system(s) 326 may be coupled to and/or controlled by the processor 314. Additionally or alternatively, the electronic device 310 may request and/or receive the one or more images from another device (e.g., one or more external cameras coupled to the electronic device 310, a network server, traffic camera(s), drop camera(s), vehicle camera(s), web camera(s), etc.). In some configurations, the electronic device 310 may request and/or receive the one or more images via the communication interface 322. For example, the electronic device 310 may or may not include camera(s) (e.g., image sensor(s) 312 and/or optical system(s) 326) and may receive images from one or more remote device(s). One or more of the images (e.g., image frames) may include one or more scene(s) and/or one or more object(s).

In some configurations, the optical system(s) 326 may include one or more lenses (e.g., wide-angle lenses, wide-FOV lenses, fisheye lenses, etc.). Accordingly, the optical system(s) 326 and image sensor(s) 312 may be components of one or more cameras (e.g., wide-angle cameras, wide-FOV cameras, fisheye cameras, etc.) that are included in the electronic device 310. Additionally or alternatively, the electronic device 310 may be coupled to and/or communicate with one or more external cameras (e.g., external wide-angle cameras, external wide-FOV cameras, external fisheye cameras, etc.).

In some configurations, the electronic device 310 may include an image data buffer (not shown). The image data buffer may buffer (e.g., store) image data from the image sensor(s) 312 and/or external camera(s). The buffered image data may be provided to the processor 314.

In some configurations, the electronic device 310 may include a camera software application and/or a display 306. When the camera application is running, images of objects that are located within the field of view of the optical system(s) 326 may be captured by the image sensor(s) 312. The images that are being captured by the image sensor(s) 312 may be presented on the display 306. For example, one or more combined view (e.g., surround view) images may be sent to the display 306 for viewing by a user. In some configurations, these images may be displayed in rapid succession at a relatively high frame rate so that, at any given moment in time, the scene(s) and/or object(s) that are located within the field of view of the optical system(s) 326 are presented on the display 306. The one or more images obtained by the electronic device 310 may be one or more video frames and/or one or more still images. In some configurations, the display 306 may present additional or alternative information. For example, the display 306 may present one or more regions of interest (e.g., bounding boxes) corresponding to one or more detected and/or tracked objects. Additionally or alternatively, the display 306 may present depth information (e.g., one or more estimated distances to one or more objects (e.g., selected objects) in a combined view).

The processor 314 may include and/or implement an image obtainer 316. One or more of the image frames may be provided to the image obtainer 316. The image obtainer 316 may obtain images (e.g., curved images, wide-angle images, wide-FOV images, fisheye images, etc.) from one or more cameras (e.g., wide-angle cameras, wide-FOV cameras, fisheye cameras, etc.). For example, the image obtainer 316 may receive image data from one or more image sensors 312 and/or from one or more external cameras. The images may be captured from a single camera (e.g., one camera at multiple positions (e.g., angles, locations, etc.)) or may be captured from multiple cameras (at different locations, for example). As described above, the image(s) may be captured from the image sensor(s) 312 (e.g., wide-angle cameras, wide-FOV cameras, fisheye cameras, etc.) included in the electronic device 310 or may be captured from one or more remote camera(s) (e.g., remote wide-angle cameras, remote wide-FOV cameras, remote fisheye cameras, etc.).

In some configurations, the image obtainer 316 may request and/or receive one or more images (e.g., wide-angle images, wide-FOV images, fisheye images, curved images, spherical images, hemispherical images, etc.). For example, the image obtainer 316 may request and/or receive one or more images from a remote device (e.g., external camera(s), remote server, remote electronic device, etc.) via the communication interface 322. The images obtained from the cameras may be processed by the processor 314 to produce a combined view (e.g., surround view).

The processor 314 may include and/or implement an image operator 318. The image operator 318 may perform one or more operations on the images (e.g., fisheye images). Examples of operations that may be performed on the images may include projecting each image (e.g., wide-angle image, wide-FOV image, fisheye image, curved image, spherical image, hemispherical image, etc.) to a 3D shape, rotating one or more 3D shapes (to align 3D shape and/or image to a particular direction), projecting at least a portion of each 3D shape to a common 3D shape enclosing all 3D shapes associated with the cameras and/or projecting at least a portion of the common 3D shape to a common plane.

The image operator 318 may project each of the images (e.g., wide-angle images, wide-FOV images, fisheye images, curved images, spherical images, hemispherical images, etc.) to a respective 3D shape. For example, the image operator 318 may project each of the images to a respective sphere, spheroid, spherical shape, curved 3D shape, hemisphere, ellipsoid, polyhedron (e.g., polyhedron that approximates a sphere or other polyhedron), trapezoidal prism, box, cube, rectangular prism, etc. For instance, each camera may produce an image that may be projected to a separate 3D shape. In some configurations, each image may be projected to a sphere. Projecting each image to a 3D shape (e.g., sphere, spheroid, ellipsoid, etc.) may make combining the images easier and/or may reduce final errors. An image may be projected to all or to a portion of the corresponding 3D shape in some approaches. For example, an image may be projected only to approximately half of a sphere (e.g., −90 degrees to 90 degrees in a horizontal direction and −70 degrees to 70 degrees in a vertical direction).

In some configurations, the image operator 318 may rotate at least one of the 3D shapes to approximately align a corresponding image to a direction. For example, when the images are projected to their respective 3D shapes, each of the 3D shapes (e.g., the images projected to the 3D shapes) may initially point the same direction. Accordingly, one or more of the 3D shapes may be rotated to point to one or more respective directions. This rotation may be a horizontal rotation (e.g., a rotation around a vertical axis). In some configurations, the direction for each 3D shape (e.g., image) may be the direction of the corresponding camera. For example, a first sphere (e.g., the first image projected on the first sphere) may be rotated to a right direction, a second sphere (e.g., the second image projected on the second sphere) may be rotated to a front direction, a third sphere (e.g., the third image projected on the third sphere) may be rotated to a left direction and/or a fourth sphere (e.g., the fourth image projected on the fourth sphere) may be rotated to a rear direction. It should be noted that in some configurations, only a subset of the 3D shapes may be rotated. For example, one of four spheres may already be pointed in the correct direction when the image is projected. Accordingly, only three of the four spheres may be rotated.

It should be noted that one or more 3D shapes (e.g., spheres) may be rotated to an approximate direction (e.g., 90 degrees, 180 degrees, 270 degrees, etc.). In some configurations, the rotation angle (in degrees and/or radians, for example) may depend on the set up of cameras. For example, a forward direction may be a 90 degree rotation in an ideal case. However, if the camera setup has rotation errors, the rotation angle vary (e.g., 92 degrees, 88 degrees, etc.).

In some configurations, the image operator 318 may rotate at least one of the 3D shapes to approximately compensate for a tilt of a corresponding camera. For example, different cameras may have different tilts. The image operator 318 may rotate one or more of the 3D shapes (e.g., spheres) such that the tilt is matched between the cameras. This rotation may be a vertical rotation (e.g., a rotation around a horizontal axis). In some configurations, the image operator 318 may tilt one or more of the 3D shapes such that the tilt of all of the 3D shapes is a specific tilt (e.g., 10 degrees, 5 degrees, 0 degrees, −5 degrees, −10 degrees, etc.). The tilt may be predetermined, user configured and/or automatically detected. For example, the tilt of one camera may be determined (e.g., calibrated, automatically detected and/or user configured). The image operator 318 may rotate the corresponding 3D shapes of the other cameras such that they match the tilt of the determined camera.

Figure 8:
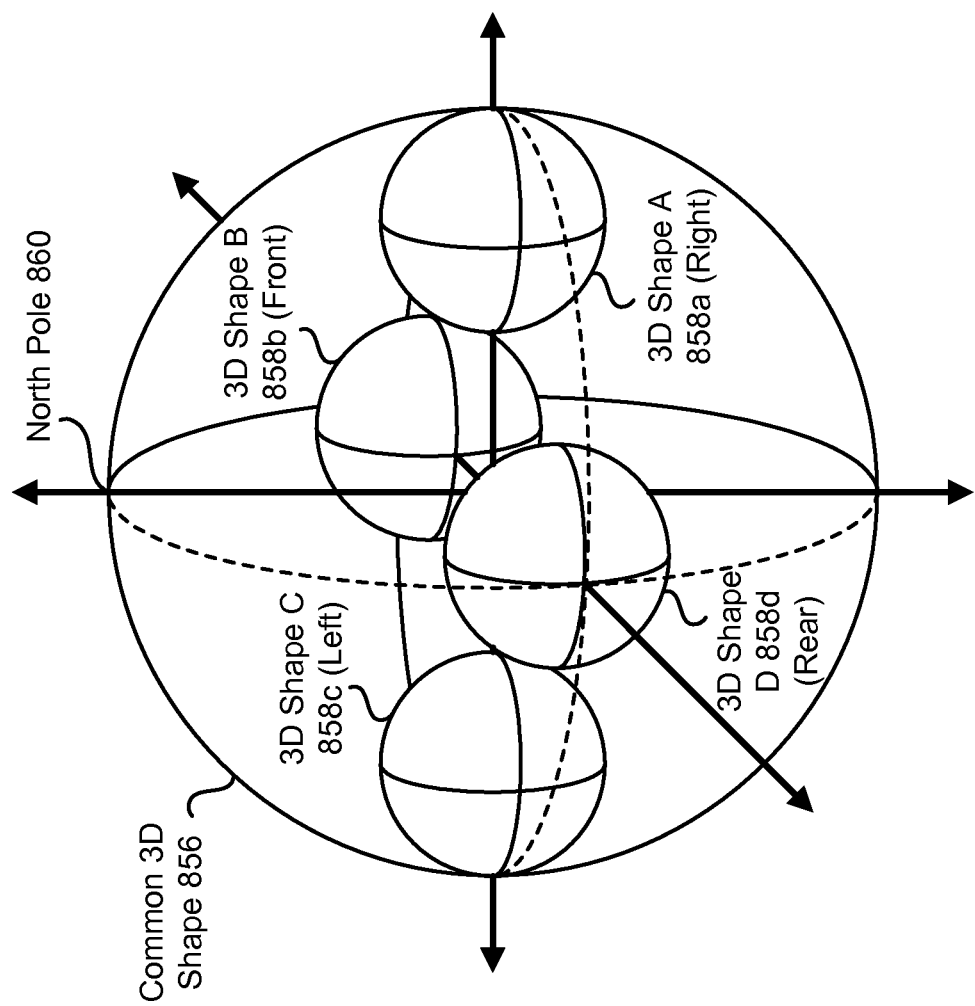
FIG. 8 is a diagram illustrating one example of a common 3D shape in accordance with the systems and methods disclosed herein.

The image operator 318 may project at least a portion of each 3D shape to a common 3D shape. The common 3D shape may enclose (e.g., contain) all of the 3D shapes that correspond to the cameras. In particular, all of the 3D shapes that correspond to the cameras may be located in the interior of the common 3D shape. More specifically, all points of a 3D shape that is enclosed by the enclosing (e.g., common) 3D shape may be within the enclosing 3D shape and/or may intersect with the enclosing 3D shape. All of the 3D shapes may be enclosed within the common 3D shape in order to facilitate projection of the 3D shapes to the common 3D shape. For example, smaller 3D shapes (e.g., spheres) can be enclosed by a larger common 3D shape (e.g., sphere). The tighter the enclosure (e.g., the less space between the interior 3D shapes and/or the less space between the interior 3D shapes and the enclosure), the smaller the errors in the final combined image may be. FIG. 8 illustrates an example of a common sphere enclosing multiple spheres.

Figure 9:
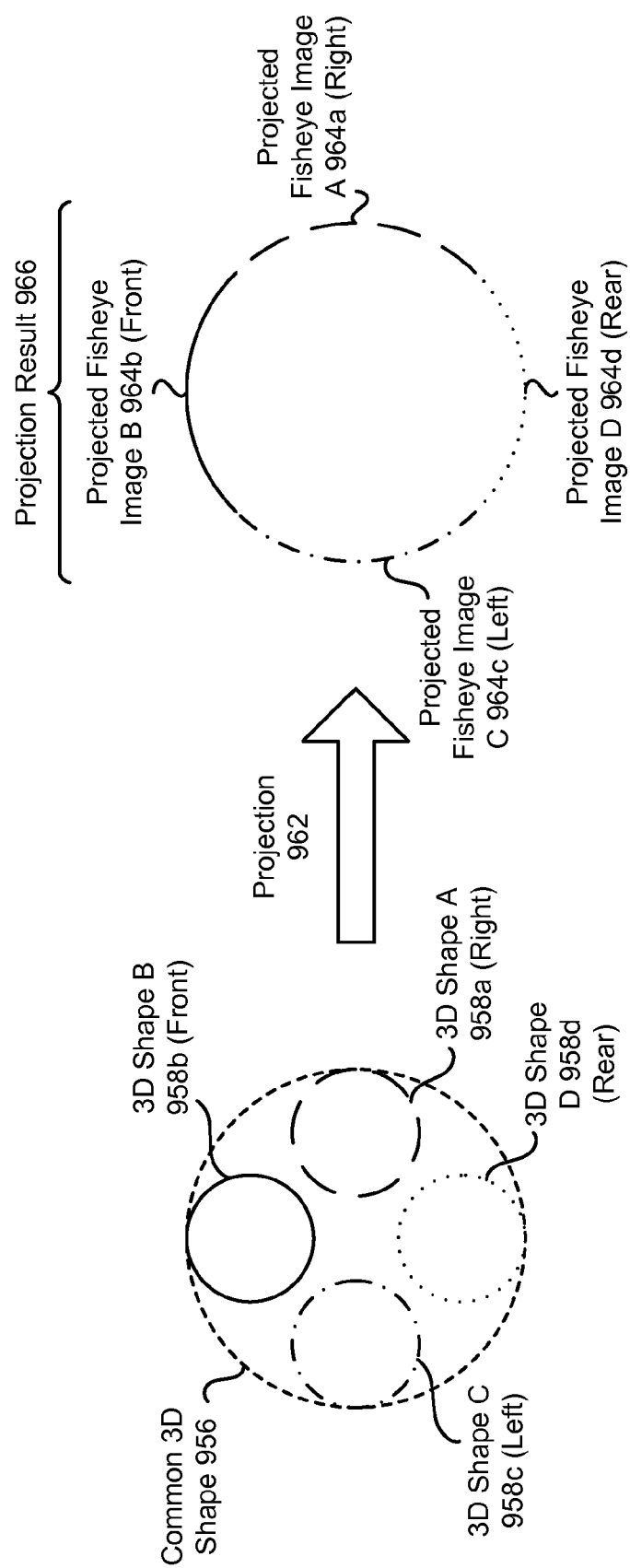
FIG. 9 is a diagram illustrating an example of projecting 3D shapes onto a common 3D shape.

The image operator 318 may project at least a portion of each 3D shape to the common 3D shape. FIG. 9 illustrates an example of spheres being projected to a common sphere. The portion of the 3D shape that may be projected may include less than, exactly, or more than a section of the 3D shape that includes the image projected to the 3D shape. This portion of the 3D shape may be projected to a portion of the common 3D shape. Accordingly, multiple images may be projected from the 3D shapes to multiple portions of the common 3D shape. In some cases and/or configurations, the multiple portions of the common 3D shape may overlap. Accordingly, the multiple images projected to the common 3D shape (from their respective 3D shapes) may overlap. In other cases and/or configurations, the multiple images projected to the common 3D shape (from their respective 3D shapes) may not overlap.

Figure 10:
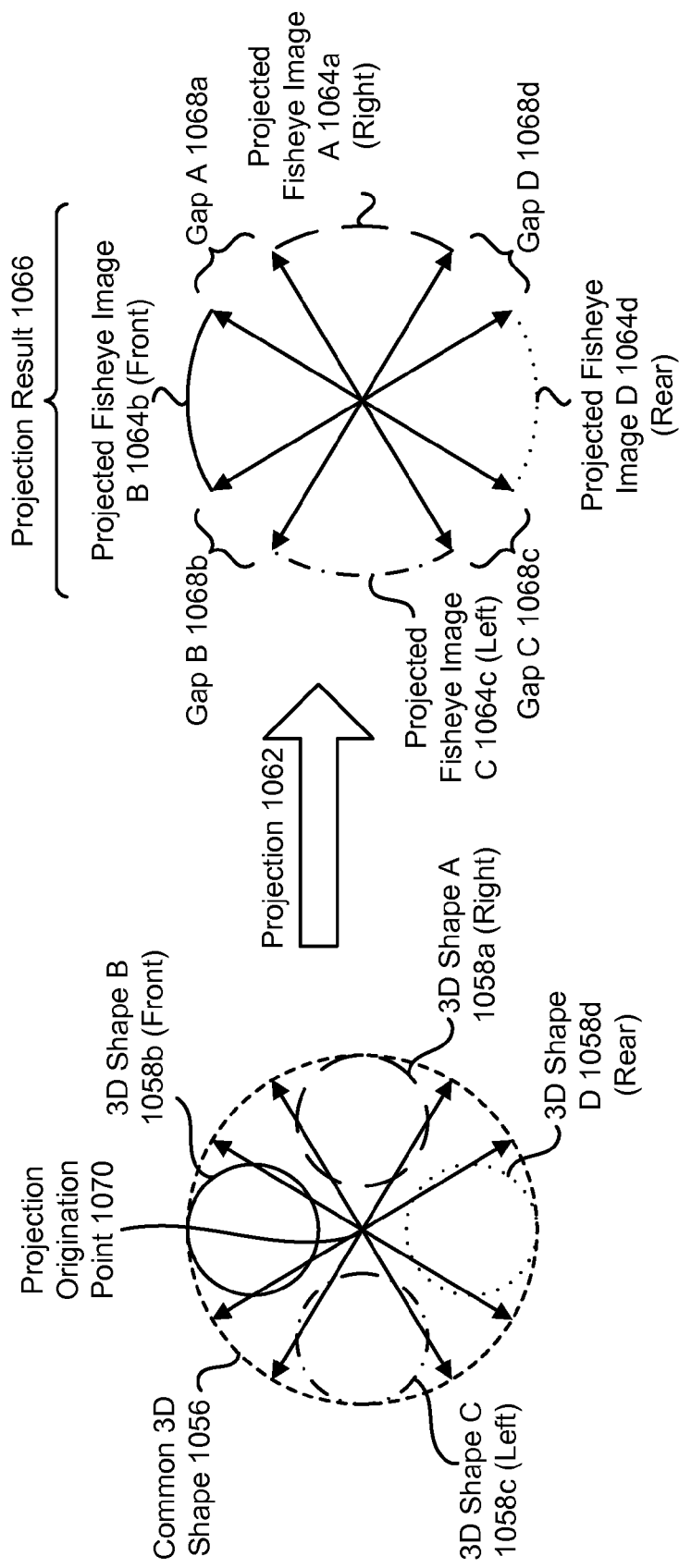
FIG. 10 is a diagram illustrating a more specific example of a projection of 3D shapes onto a common 3D shape.
Figure 11:
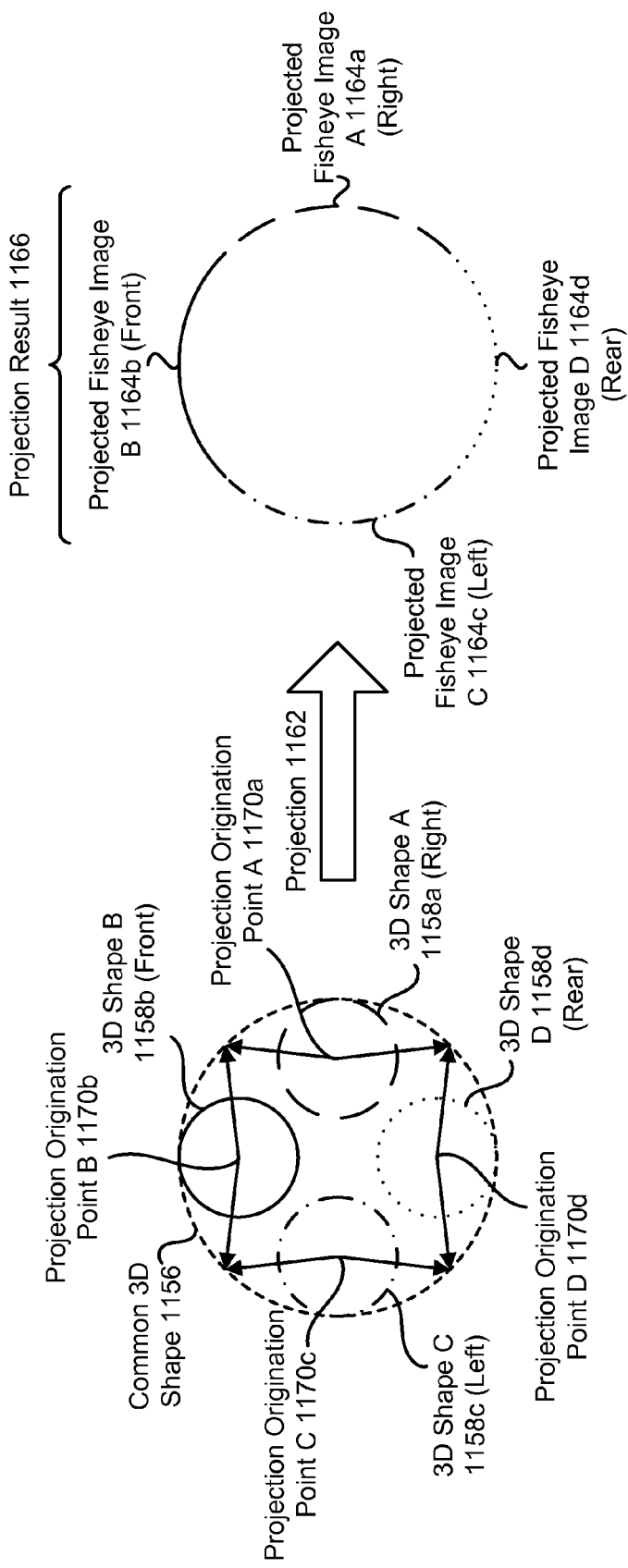
FIG. 11 is a diagram illustrating another more specific example of a projection of 3D shapes onto a common 3D shape.

One or more projection origination points may be utilized. For example, one or more interior points and/or one or more exterior points relative to the common 3D shape may be utilized as projection origination points. In some configurations, a center of a common sphere may be utilized as a projection origination point for the projection of each of a number of spheres (corresponding to each camera, for example) to the common sphere. FIG. 10 illustrates an example of a sphere center as a projection origination point. In other configurations, the centers of each of a number of spheres (corresponding to each camera, for example) may be utilized as projection origination points for each respective sphere. FIG. 11 illustrates an example of centers of spheres as projection origination points.

Figure 12:
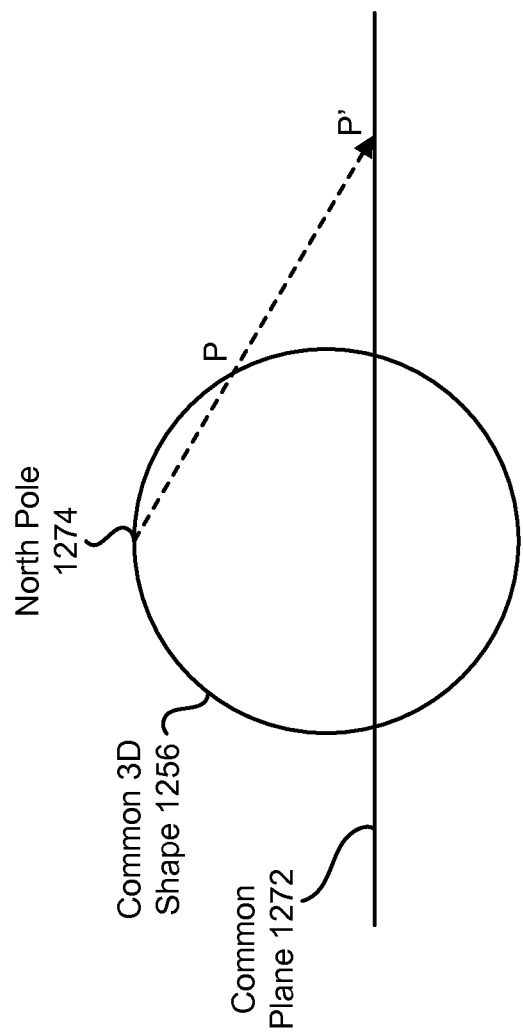
FIG. 12 is a diagram illustrating an example of a common 3D shape being projected to a common plane.

In some configurations, the image operator 318 may project at least a portion of the common 3D shape to a common plane. The portion of the common 3D shape that may be projected may include less than, exactly, or more than a section of the common 3D shape that includes the images projected to the common 3D shape. This portion of the common 3D shape may be projected to a portion of the common plane. Accordingly, multiple images may be projected from the common 3D shape to a portion of the common plane. In some cases and/or configurations, a projection origination point may be exterior to, upon, or interior to the common 3D shape. For example, the projection origination point may be at a top central point of the common 3D shape. FIG. 12 illustrates an example of the common 3D shape being projected to a common plane, where the projection origination point is a north pole of a sphere. In some configurations, the common plane may be approximately parallel to the ground.

The processor 314 may include and/or implement a combined view generator 320. The combined view generator 320 may generate a combined view based on the images. In some configurations, the combined view generator 320 may combine the images (that have been projected to the common plane, for instance) to form the combined image. For example, the combined view generator 320 may perform image alignment (e.g., registration), seam finding and/or trimming (e.g., cropping) to produce a combined image.

Figure 13:
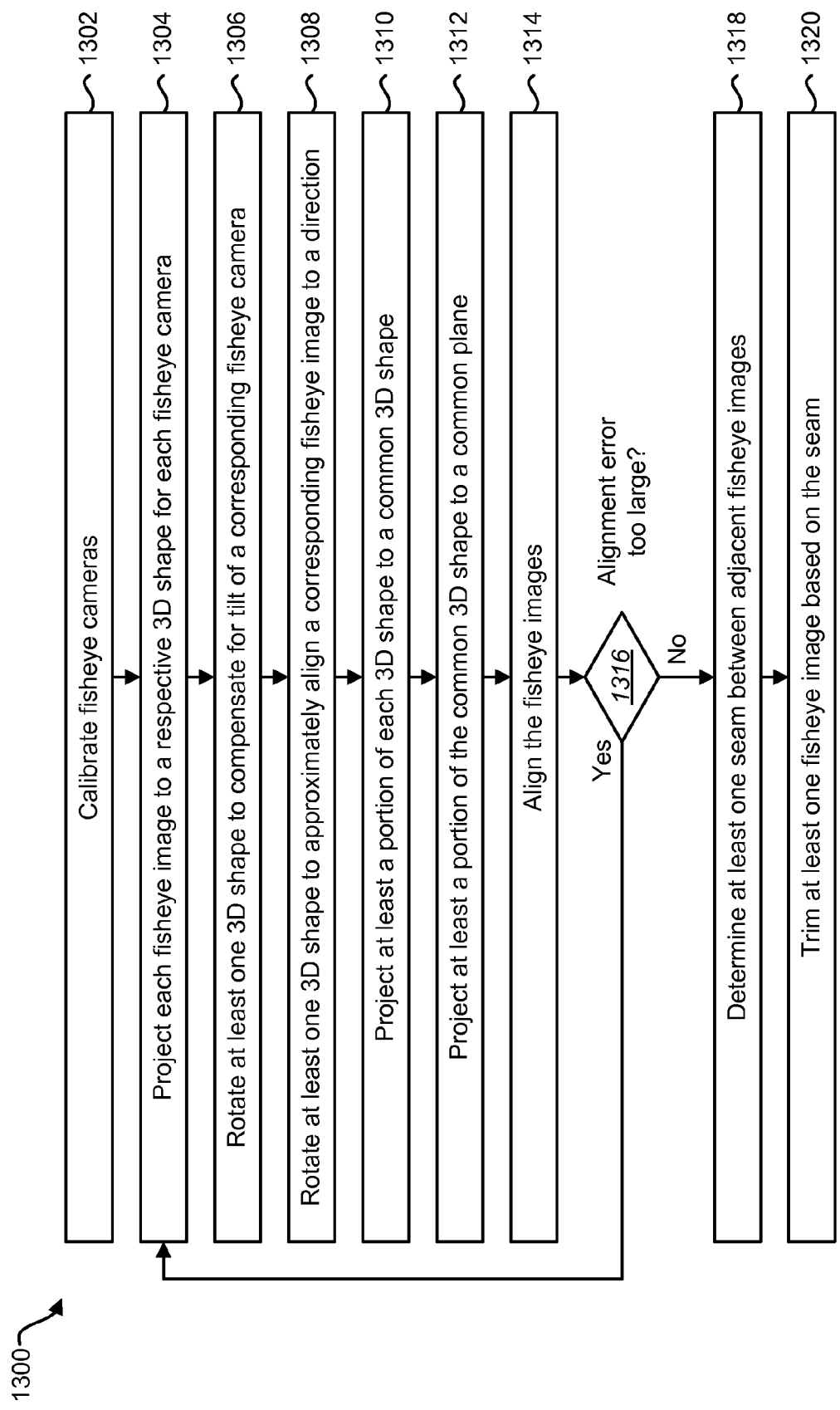
FIG. 13 is a flow diagram illustrating a more specific configuration of a method for producing a combined view.

Image alignment may include aligning the images in order to approximately match overlapping areas (e.g., regions) of the images (in the common plane, for instance). For example, all or portions of the overlapping areas may be approximately matched to align the images. In some configurations, the images may be translated and/or scaled in order to approximately match the overlapping areas. For example, an affine transform may be applied to align the images. Additionally or alternatively, a projective transform and/or image morphing may be utilized to align the images. In some configurations, one or more of the foregoing procedures (e.g., projecting each image to a 3D shape, rotating to compensate for tilt, rotating one or more of the 3D shapes to a direction, projecting each 3D shape to a common 3D shape, projecting the common 3D shape to a common plane, translation, rotation, projective transform, morphing, etc.) may be repeated and/or skipped until an alignment error is less than an alignment error threshold. FIG. 13 illustrates an example of image alignment where one or more of these procedures may be repeated and/or skipped based on an alignment error.

Seam finding (e.g., seam selection) may include determining a seam between adjacent images (e.g., in overlapping areas between images). The seam may be generated in order to improve continuity (e.g., reduce discontinuity) between the images. For example, the combined view generator 320 may determine a seam along which the images match well and/or where differences are small (e.g., where edges, objects, textures, color and/or intensity match well). Trimming the images may include trimming (e.g., cropping) portions of the overlapping areas. For each image, for example, image data on one side of the seam may be kept, while image data on the other side of the seam may be trimmed (e.g., cropped, discarded, etc.). The resulting combined image on the common plane may be the combined view in some configurations.

In some configurations, the combined view generator 320 may project the combined image to a shape. For example, the combined image (on the common plane, for instance) may be projected to shape such as a bowl (e.g., bowl interior), a cup (e.g., cup interior), a sphere (e.g., whole sphere interior, partial sphere interior, half-sphere interior, etc.), a spheroid (e.g., whole spheroid interior, partial spheroid interior, half-spheroid interior, etc.), a cylinder (e.g., whole cylinder interior, partial cylinder interior, etc.), an ellipsoid (e.g., whole ellipsoid interior, partial ellipsoid interior, half-ellipsoid interior, etc.), polyhedron (e.g., polyhedron interior, partial polyhedron interior, etc.), trapezoidal prism (e.g., trapezoidal prism interior, partial trapezoidal prism interior, etc.), etc. This may provide a 3D effect in some configurations. In some approaches, a "bowl" (e.g., multilayer bowl) shape may be a (whole or partial) sphere, spheroid, or ellipsoid with a flat (e.g., planar) base. The shape may or may not be symmetrical. In some configurations, the electronic device 310 (e.g., combined view generator 320) may insert a model (e.g., 3D model) or representation of the electronic device 310 (e.g., vehicle, drone, etc.) in an image view. The model or representation may be predetermined in some configurations. The resulting combined image projected to the shape may be the combined view.

In some configurations, the combined view generator 320 may render the combined view (on the common plane and/or on the shape). The rendered combined view may be presented on the display 306. For example, the processor 314 may provide the combined view to the display 306, which may present the combined view.

The combined view may be presented from a viewpoint (e.g., perspective, camera angle, etc.). For example, the combined view may be presented from a top-down viewpoint, a back-to-front viewpoint (e.g., raised back-to-front, lowered back-to-front, etc.), a front-to-back viewpoint (e.g., raised front-to-back, lowered front-to-back, etc.), an oblique viewpoint (e.g., hovering behind and slightly above, other angled viewpoints, etc.), etc.

Some configurations of the systems and methods disclosed herein may also provide free view rendering, where the combined view may be rendered from any viewpoint (e.g., any rendering angle) or given ranges of viewpoints. In some configurations, the combined view may be adjusted based on user interface 328 input. For example, the user interface 328 (e.g., a touchscreen) may receive an input that indicates a rotation, shift, and/or zoom of the combined view. For example, the combined view generator 320 may change the rotation of the combined view based on a swipe, which may indicate a rotation in the swipe direction, may change the shift of the combined view based on a multi-touch swipe (e.g., two-finger swipe), may indicate a shift in the swipe direction, and/or may change the zoom of the combined view based on a multi-touch pinch or spread.

In some configurations, the electronic device 310 may identify a region of interest (ROI) in the one or more images (e.g., combined image). For example, the electronic device 310 may perform object detection based on the one or more images and. For instance, the electronic device 310 may detect objects such as signs, road signs, traffic signs, traffic signals, people, faces, symbols (e.g., characters, text, numbers, etc.), vehicles, buildings, obstructions, etc. The electronic device 310 may identify the ROI based on the detected object. For example, the ROI may be a region that is established relative to the detected object. In some configurations, the electronic device 310 may bound the detected object with a bounding box. The ROI may be region included within the bounding box. The electronic device 310 may zoom at least a portion of the combined view based on the ROI. In one example, the electronic device 310 (e.g., combined view generator 320) may change the viewpoint in order to enlarge the ROI. In another example, the electronic device 310 (e.g., combined view generator 320) may generate a magnifying window on the display 306 that presents a zoomed version of the ROI. In some configurations, the electronic device 310 (e.g., processor 314 and/or display 306) may generate one or more lines connecting the magnifying window to the location of the ROI in the image visualization.

The memory 308 may store instructions and/or data. The processor 314 may access (e.g., read from and/or write to) the memory 308. Examples of instructions and/or data that may be stored by the memory 308 may include image data, image combining data (e.g., seam location data), combined view data (e.g., geometry data, geometry parameters, geometry viewpoint data, geometry shift data, geometry rotation data, etc.), object data (e.g., location, size, shape, etc.), image obtainer 316 instructions, image operator 318 instructions, and/or combined view generator 320 instructions, etc.

The memory 308 may store the images and instruction codes for performing operations by the processor 314. The memory 308 may be any electronic component capable of storing electronic information. The memory 308 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data and instructions may be stored in the memory 308. The instructions may be executable by the processor 314 to implement one or more of the methods described herein. Executing the instructions may involve the use of the data that is stored in the memory 308. When the processor 314 executes the instructions, various portions of the instructions may be loaded onto the processor 314, and various pieces of data may be loaded onto the processor.

In some configurations, the electronic device 310 may present a user interface 328 on the display 306. For example, the user interface 328 may enable a user to interact with the electronic device 310. In some configurations, the user interface 328 may enable a user to indicate preferences (e.g., combined view settings) and/or interact with the combined view. For example, the user interface 328 may receive one or more commands for changing the combined view (e.g., zooming in or out, rotating the combined view, shifting the combined view, changing combined view shape, changing the combined view viewpoint, etc.). Additionally or alternatively, the user interface 328 may receive an input (e.g., a tap) that indicates a selection of an object in the combined view. In some configurations, the selected object may be tracked. It should be noted that one or more the parameters used in the algorithm (e.g., zoom, viewpoint, projection shape(s), cropping, etc.) may be adjusted based on an input (e.g., manually). Additionally or alternatively, one or more parameters may be adapted for optimization problems, which may be solved by minimizing some defined energy functions, for example.

In some configurations, the display 306 may be a touchscreen that receives input from physical touch (by a finger, stylus or other tool, for example). For instance, the touchscreen may be an input interface that receives touch input indicating user preference(s) and/or one or more modifications the image visualization. Additionally or alternatively, the electronic device 310 may include or be coupled to another input interface. For example, the electronic device 310 may include a camera facing a user and may detect user gestures (e.g., hand gestures, arm gestures, eye tracking, eyelid blink, etc.). In another example, the electronic device 310 may be coupled to a mouse and may detect a mouse click indicating an input.

It should be noted that no user input may be necessary in some configurations. For example, the electronic device 310 may automatically produce the combined view as described herein.

In some configurations, the electronic device 310 (e.g., processor 314) may optionally be coupled to, be part of (e.g., be integrated into), include and/or implement an advanced driving assistance system (ADAS). For example, the electronic device 310 may present the combined view in a vehicle (on an in-dash display, a console display, a windshield projector, a heads-up display, optical head mounted display, etc.). This may assist the driver in situational awareness and/or collision avoidance.

The electronic device 310 (e.g., processor 314) may optionally be coupled to, be part of (e.g., be integrated into), include and/or implement one or more other kinds of devices. For example, the electronic device 310 may be implemented in a drone equipped with cameras. The combined view may provide a wide view of the scene captured by multiple cameras on the drone. In another example, the electronic device 310 (e.g., processor 314) may be implemented in an action camera (including one or more cameras and/or lenses).

It should be noted that one or more of the elements or components of the electronic device may be combined and/or divided. For example, the image obtainer 316, the image operator 318 and/or the combined view generator 320 may be combined. Additionally or alternatively, one or more of the image obtainer 316, the image operator 318 and/or the combined view generator 320 may be divided into elements or components that perform a subset of the operations thereof.

Figure 4:
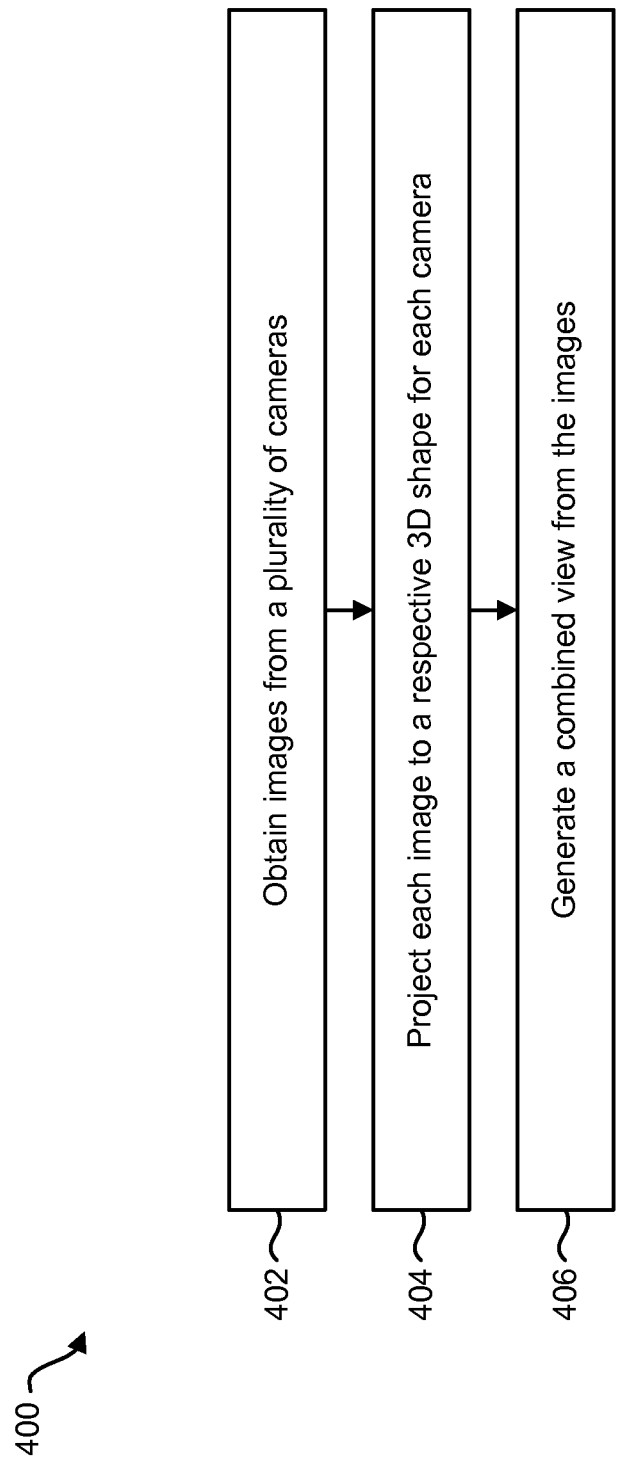
FIG. 4 is a flow diagram illustrating one configuration of a method for producing a combined view.

FIG. 4 is a flow diagram illustrating one configuration of a method 400 for producing a combined view. The method 400 may be performed by the electronic device 310 described herein, for example.

The electronic device 310 may obtain 402 images (e.g., wide-angle images, wide-FOV images, fisheye images, curved images, spherical images, hemispherical images, etc.) from a plurality of cameras (e.g., wide-angle cameras, wide-FOV cameras, fisheye cameras, etc.). This may be accomplished as described in connection with one or more of FIGS. 1 and 3. For example, the electronic device 310 may obtain images from a plurality of cameras included in the electronic device 310. In another example, the electronic device 310 may request and/or receive the images from multiple cameras coupled to (e.g., in electronic communication with) the electronic device 310. In yet another example, the electronic device 310 may request and/or receive the images from one or more remote devices (e.g., remote server, etc.). In some configurations, each camera may supply one image of the plurality of images (at a time, for example).

The electronic device 310 may project 404 each image (e.g., wide-angle image, wide-FOV image, fisheye image, curved image, spherical image, hemispherical image, etc.) to a respective 3D shape for each camera. This may be accomplished as described in connection with FIG. 3. For example, the electronic device 310 may project each of the images to a separate 3D shape (e.g., sphere, ellipsoid, polyhedron, etc.). For instance, each of the images may be mapped to all or a portion of a 3D shape. It should be noted that each of the 3D shapes may be the same type (e.g., all spheres) or one or more of the 3D shapes may be different (e.g., three spheres and an ellipsoid, etc.).

The electronic device 310 may generate 406 a combined view from the images (e.g., wide-angle images, wide-FOV images, fisheye images, curved images, spherical images, hemispherical images, etc.). This may be accomplished as described in connection with FIG. 3. For example, the electronic device 310 may perform image alignment, seam finding and/or trimming. For instance, the electronic device 310 may align the images (e.g., projections of the images on the 3D shapes, projections of the images on a common 3D shape and/or projections of the images on a common plane, etc.). For example, the electronic device 310 may align at least portions of the images projected to the common plane. In some configurations, the electronic device 310 may determine whether an alignment error is small enough (e.g., less than an alignment error threshold) and/or may repeat one or more operations until the alignment error is small enough. The electronic device 310 may find seams between adjacent images and/or may trim a portion of each of the images.

In some configurations, the electronic device 310 may display the combined view. This may be accomplished as described in connection with FIG. 3. For example, the electronic device 310 (e.g., processor 314) may provide the combined view to a display (e.g., a display 306 included in the electronic device 310 or to a display that is coupled to and/or in communication with the electronic device 310). The display may present the combined view. In some configurations, the cameras may be installed in a vehicle and the combined view may be presented in a vehicle.

Figure 5:
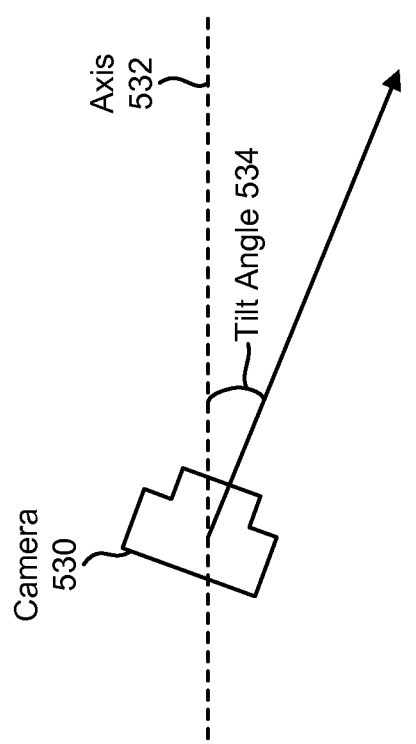
FIG. 5 shows an example of a tilt angle of a camera.

FIG. 5 shows an example of a tilt angle 534 of a camera 530. In this example, the camera 530 (e.g., fisheye camera) is tilted downward relative to an axis 532. The axis 532 may be an arbitrary axis (e.g., parallel to the ground, perpendicular to a gravitational vector, aligned with a horizon, an axis relative to the structure of a physical body (e.g., vehicle, drone frame, building, etc.), a pointing direction of another camera, a predetermined axis, etc.).

The tilt angles of different cameras (e.g., fisheye cameras) may be different and can be relatively large. Accordingly, different cameras (e.g., fisheye cameras) may capture a surrounding scene at different angles. Examples of images captured at different tilt angles are given in connection with FIGS. 1 and 6.

Figure 6:
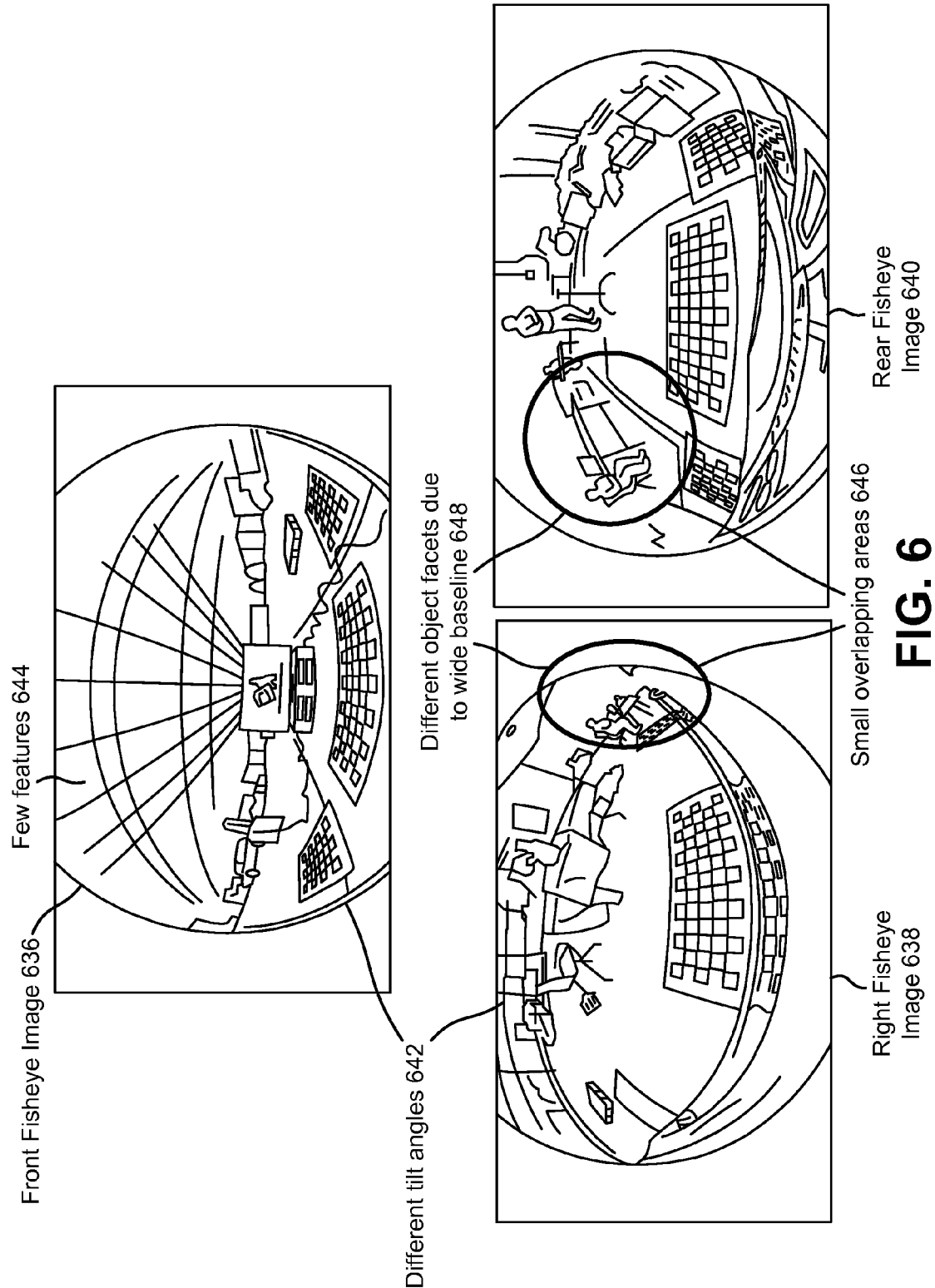
FIG. 6 is an example of fisheye images that illustrates some of the difficulties in combining multiple fisheye images from fisheye cameras with different locations.

FIG. 6 is an example of fisheye images 636, 638, 640 that illustrates some of the difficulties in combining multiple fisheye images from fisheye cameras with different locations. In particular, FIG. 6 illustrates the effects of different tilt angles 642, small overlapping areas 646 between adjacent fisheye images, and different facets of the same object due to a wide baseline 648. More specifically, the images from adjacent cameras may have overlapping regions. However, the overlapping region between adjacent cameras may be quite small and may lack common features. As illustrated in FIG. 6, the right fisheye image 638 and the rear fisheye image 640 have small overlapping areas 646, where common objects show different facets (e.g., different sides) between the right fisheye image 638 and the rear fisheye image 640. Moreover, the front fisheye image 636 and the right fisheye image 638 exhibit different tilt angles 642. In some cases, the scenes captured by the fisheye cameras may exhibit few features 644 (e.g., may have large texture-less regions, such as sky or ground). As described above, the fisheye images 636, 638, 640 also exhibit large distortions. Therefore, connecting the fisheye images 636, 638, 640 from the fisheye cameras to generate a large FOV (such as 360 degrees) combined view (e.g., surround view) is a challenging problem.

Figure 7:
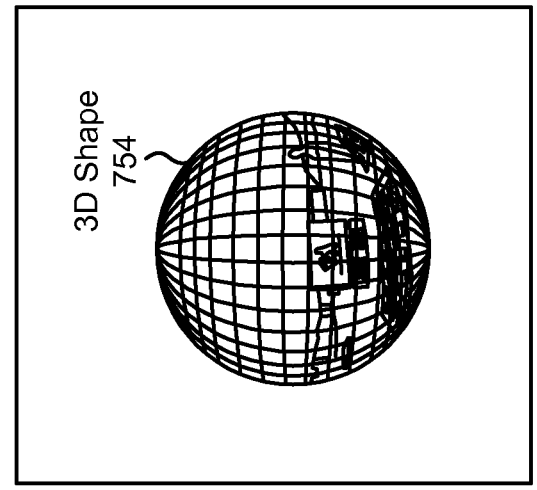
FIG. 7 illustrates one example of projecting a fisheye image to a three-dimensional (3D) shape.
Figure 7:
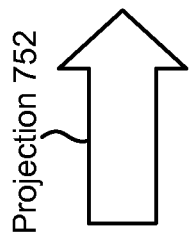
Figure 7:
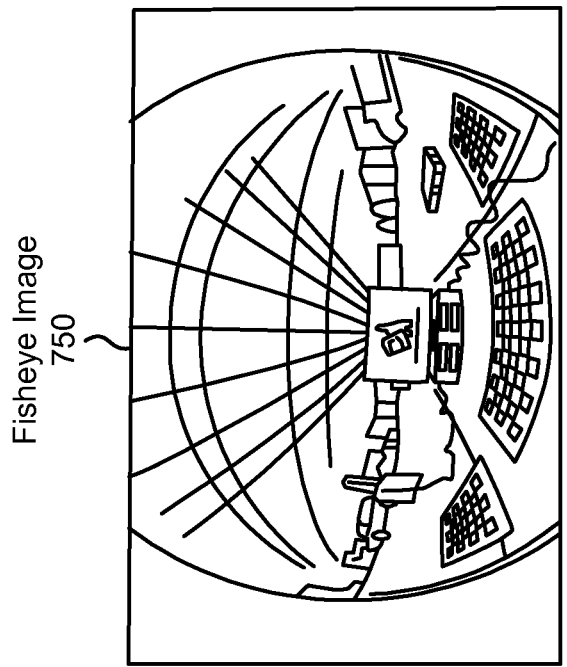

FIG. 7 illustrates one example of projecting a fisheye image 750 to a 3D shape 754. In order to ameliorate the aforementioned difficulties (described in connection with FIG. 6, for example), each of the plurality of fisheye cameras may be modeled as a separate 3D shape (e.g., sphere) in some configurations. As illustrated in FIG. 7, for example, each fisheye image 750 may be projected 752 to a corresponding 3D shape 754 (e.g., sphere). Due to existence of the wide baseline between adjacent fisheye cameras (installed in a vehicle, for example), each fisheye camera may be modeled as a separate 3D shape with a different 3D location and/or a different dimension (e.g., radius) related to the focal length of the fisheye lens.

As described above, multiple fisheye images may be obtained by the electronic device 310. Having different fisheye cameras with different tilt angles may cause difficulties with alignment between the fisheye images. In accordance with the systems and methods disclosed herein, each fisheye image 750 may be projected 752 to a respective 3D shape 754. For example, a projection step may be applied to each fisheye image separately. It should be noted that the 3D shapes (e.g., spheres) may be separate and may have different sizes (e.g., radii) in some configurations.

One or more of the 3D shapes 754 may be rotated to compensate for the tilt(s) of one or more corresponding fisheye cameras. For example, one or more of the 3D shapes may be vertically rotated to compensate for the tilt angle. For instance, one or more of the 3D shapes with projected fisheye images may be rotated such that the vertical alignment is approximately consistent between the fisheye images. Accordingly, one or more of the fisheye images projected to the one or more 3D shapes may be rotated upward and/or downward. This rotation may vertically align the fisheye images to an axis in some configurations.

As described above, each 3D shape 754 (with a projected fisheye image) may be rotated to approximately align a corresponding fisheye image to a direction. For example, when each fisheye image 750 is projected 752 to a 3D shape 754, each of the 3D shapes (e.g., fisheye images projected to the 3D shapes) may point the same direction. One or more of the 3D shapes may be rotated to a corresponding direction (e.g., a direction that may approximate the direction of the corresponding fisheye camera).

FIG. 8 is a diagram illustrating one example of a common 3D shape 856 in accordance with the systems and methods disclosed herein. Specifically, FIG. 8 illustrates four 3D shapes 858a-d enclosed by a common 3D shape 856. In this example, each of the enclosed 3D shapes 858a-d is a sphere and the common 3D shape 856 is a sphere. In this example, each of the enclosed 3D shapes 858a-d corresponds to a respective fisheye camera, where each respective fisheye image from each of the fisheye cameras has been respectively projected to each of the 3D shapes 858a-d.

As can be observed in FIG. 8, each of the enclosed 3D shapes 858a-d may be within the common 3D shape 856 (e.g., all points of the 3D shapes 858a-d are at or within the surface of the common 3D shape 856). For example, each of the smaller spheres for the fisheye cameras may be enclosed by a common sphere as shown in FIG. 8. For instance, FIG. 8 shows four smaller spheres (3D shapes 858a-d) that may correspond to four fisheye cameras installed in the front (e.g., 3D shape B 858b), left (e.g., 3D shape C 858c), right (e.g., 3D shape A 858a) and rear (e.g., 3D shape D 858d) directions of a vehicle, and a common sphere (common 3D shape 856) enclosing the four individual spheres. It should be noted that enclosed 3D shapes be the same type (e.g., same shape) or different types and/or may be the same size or different sizes.

As illustrated in FIG. 8, the common 3D shape 856 may have a north pole 860. The north pole 860 may be a central location or point at the top of the common 3D shape 856. In some configurations, the north pole 860 may be utilized as a projection origination point for projecting the common 3D shape 856 onto a common plane.

FIG. 9 is a diagram illustrating an example of projecting 962 3D shapes 958a-d onto a common 3D shape 956. For clarity in illustration, the common 3D shape 956 and the 3D shapes 958a-d are shown from a top-down view. In particular, the common 3D shape 956 (e.g., common sphere) described in connection with FIG. 9 may be an example of the common 3D shape 856 (e.g., common sphere) described in connection with FIG. 8 and the 3D shapes 958a-d (e.g., spheres corresponding to fisheye cameras) described in connection with FIG. 9 may be examples of the 3D shapes 858a-d (e.g., spheres corresponding to fisheye cameras) described in connection with FIG. 8. In particular, the small circles in FIG. 9 may represent 3D shapes 958a-d (e.g., spheres) onto which the original fisheye images are projected. The larger dashed circle may represent the common 3D shape 956 (e.g., common sphere) enclosing the small 3D shapes 958a-d (e.g., spheres).

Each of the 3D shapes 958a-d may be projected 962 to the common 3D shape 956. FIG. 9 illustrates an example of a projection result 966 from projecting 962 each of the 3D shapes 958a-d onto the common 3D shape 956. For instance, the projection results 966 may represent a common sphere (common 3D shape 956) after the spheres (3D shapes 958a-d) for the fisheye cameras are projected onto it. The different patterned lines in the projection result 966 may represent projected fisheye images 964a-d corresponding to the 3D shapes 958a-d (e.g., fisheye images from different cameras). For example, projected fisheye image A 964a may be a fisheye image projected from 3D shape A 958a onto the common 3D shape 956, projected fisheye image B 964b may be a fisheye image projected from 3D shape B 958b onto the common 3D shape 956, projected fisheye image C 964c may be a fisheye image projected from 3D shape C 958c onto the common 3D shape 956 and projected fisheye image D 964d may be a fisheye image projected from 3D shape D 958d onto the common 3D shape 956.

It should be noted that before the projection, in some configurations, rotation may be performed on one or more of the 3D shapes (e.g., small spheres) such that the fisheye image(s) is/are placed at a correct camera position. For example, rotation may be performed for a front 3D shape corresponding to a front camera such that its projected image in the common 3D shape (e.g., sphere) is at the front.

FIG. 10 is a diagram illustrating a more specific example of a projection 1062 of 3D shapes 1058a-d onto a common 3D shape 1056. For clarity in illustration, the common 3D shape 1056 and the 3D shapes 1058a-d are shown from a top-down view. In particular, the common 3D shape 1056 (e.g., common sphere) described in connection with FIG. 10 may be an example of the common 3D shape 856 (e.g., common sphere) described in connection with FIG. 8 and the 3D shapes 1058a-d (e.g., spheres corresponding to fisheye cameras) described in connection with FIG. 10 may be examples of the 3D shapes 858a-d (e.g., spheres corresponding to fisheye cameras) described in connection with FIG. 8. In particular, the small circles in FIG. 10 may represent 3D shapes 1058a-d (e.g., spheres) onto which the original fisheye images are projected. The larger dashed circle may represent the common 3D shape 1056 (e.g., common sphere) enclosing the small 3D shapes 1058a-d (e.g., spheres).

Each of the 3D shapes 1058a-d may be projected 1062 to the common 3D shape 1056. FIG. 10 illustrates an example of a projection result 1066 from projecting 1062 each of the 3D shapes 1058a-d onto the common 3D shape 1056. For instance, the projection results 1066 may represent a common sphere (common 3D shape 1056) after the spheres (3D shapes 1058a-d) for the fisheye cameras are projected onto it. The different patterned lines in the projection result 1066 may represent projected fisheye images 1064a-d corresponding to the 3D shapes 1058a-d (e.g., fisheye images from different cameras). For example, projected fisheye image A 1064a may be a fisheye image projected from 3D shape A 1058a onto the common 3D shape 1056, projected fisheye image B 1064b may be a fisheye image projected from 3D shape B 1058b onto the common 3D shape 1056, projected fisheye image C 1064c may be a fisheye image projected from 3D shape C 1058c onto the common 3D shape 1056 and projected fisheye image D 1064d may be a fisheye image projected from 3D shape D 1058d onto the common 3D shape 1056.

In the configuration illustrated in FIG. 10, a projection origination point 1070 is at a center of the common 3D shape 1056 (e.g., sphere). For example, an approximate center of the common 3D shape 1056 may be used as the projection origination point (e.g., projection center) for projecting the 3D shapes A-D 1058a-d to the common 3D shape 1056. Each 3D shape 1058a-d (e.g., enclosed 3D shape, small sphere, etc.) may have its own usable area. The usable area may be determined by the field of view of the corresponding fisheye camera. For example, the usable area of 3D shape B 1058*b* may be approximately a front half portion (e.g., hemisphere, hemiellipsoid, arc, etc.) of 3D shape B 1058*b*. For example, an arc from the leftmost point to the rightmost point of 3D shape B 1058 (over a given vertical range, for instance) may represent the usable parts of 3D shape B 1058*b* for the front fisheye camera. It should be noted the usable part of a 3D shape may have a smaller or larger range in vertical and/or horizontal dimensions. For example, the usable part of a 3D shape may range from 2 to 178 degrees in a horizontal direction and −80 to 80 degrees in a vertical direction.

The usable part of each 3D shape 1058*a-d* (e.g., sphere) may be projected to the common 3D shape (e.g., common sphere) for each 3D shape 1058*a-d*. As illustrated in the projection result 1066, gaps 1068*a-d* may exist between projected images on the common 3D shape (e.g., common sphere). In some configurations, these gaps 1068*a-d* may be removed. For example, the projected fisheye images 1064*a-d* may be aligned. For instance, the electronic device 310 may perform an affine transformation to help remove the gaps 1068*a-d*.

In some configurations, the projection origination point 1070 may be the approximate center of the common 3D shape 1056 (e.g., common sphere). The approximate center of the common 3D shape 1056 may be determined from the centers of the small 3D shapes 1058*a-d* (e.g., spheres) in some approaches. For example, the electronic device 310 may determine a point with the same distances to all centers of the small 3D shapes 1058*b* (e.g., spheres). The point may be utilized as a projection origination point 1070 and/or may be taken as the center of the common 3D shape 1056 (e.g., common sphere). In some approaches, the size (e.g., radius) of the common 3D shape 1056 (e.g., common sphere) may be determined by the electronic device 310 by requiring the common 3D shape 1056 (e.g., sphere) to enclose all small 3D shapes 1058*a-d* (e.g., spheres) as close as possible.

In one example, a common sphere may be approximately tangent to all small spheres. Using the center of the common sphere as the point of projection, the small spheres may be projected to the common sphere. Depending on the field of view (FOV) of the fisheye cameras, parts of the small spheres corresponding to the scenes may be projected to the common sphere.

FIG. 11 is a diagram illustrating another more specific example of a projection 1162 of 3D shapes 1158*a-d* onto a common 3D shape 1156. For clarity in illustration, the common 3D shape 1156 and the 3D shapes 1158*a-d* are shown from a top-down view. In particular, the common 3D shape 1156 (e.g., common sphere) described in connection with FIG. 11 may be an example of the common 3D shape 856 (e.g., common sphere) described in connection with FIG. 8 and the 3D shapes 1158*a-d* (e.g., spheres corresponding to fisheye cameras) described in connection with FIG. 11 may be examples of the 3D shapes 858*a-d* (e.g., spheres corresponding to fisheye cameras) described in connection with FIG. 8. In particular, the small circles in FIG. 11 may represent 3D shapes 1158*a-d* (e.g., spheres) onto which the original fisheye images are projected. The larger dashed circle may represent the common 3D shape 1156 (e.g., common sphere) enclosing the small 3D shapes 1158*a-d* (e.g., spheres).

Each of the 3D shapes 1158*a-d* may be projected 1162 to the common 3D shape 1156. FIG. 11 illustrates an example of a projection result 1166 from projecting 1162 each of the 3D shapes 1158*a-d* onto the common 3D shape 1156. For instance, the projection results 1166 may represent a common sphere (common 3D shape 1156) after the spheres (3D shapes 1158*a-d*) for the fisheye cameras are projected onto it. The different patterned lines in the projection result 1166 may represent projected fisheye images 1164*a-d* corresponding to the 3D shapes 1158*a-d* (e.g., fisheye images from different cameras). For example, projected fisheye image A 1164*a* may be a fisheye image projected from 3D shape A 1158*a* onto the common 3D shape 1156, projected fisheye image B 1164*b* may be a fisheye image projected from 3D shape B 1158*b* onto the common 3D shape 1156, projected fisheye image C 1164*c* may be a fisheye image projected from 3D shape C 1158*c* onto the common 3D shape 1156 and projected fisheye image D 1164*d* may be a fisheye image projected from 3D shape D 1158*d* onto the common 3D shape 1156.

In the configuration illustrated in FIG. 11, projection origination points 1170*a-b* are at the centers of the 3D shapes 1158*a-d* (e.g., spheres). For example, an approximate center of each the 3D shapes 1158*a-d* may be respectively used as projection origination points 1170*a-d* for projecting the 3D shapes A-D 1158*a-d* to the common 3D shape 1156. For instance, the center of each small sphere may be used as a projection center for each respective sphere.

As discussed above, each 3D shape 1158*a-d* (e.g., enclosed 3D shape, small sphere, etc.) may have its own usable area. The usable area may be determined by the field of view of the corresponding fisheye camera. For example, the usable area of 3D shape B 1158*b* may be approximately a front half portion (e.g., hemisphere, hemiellipsoid, arc, etc.) of 3D shape B 1158*b*. For example, an arc from the leftmost point to the rightmost point of 3D shape B 1158 (over a given vertical range, for instance) may represent the usable parts of 3D shape B 1158*b* for the front fisheye camera. It should be noted the usable part of a 3D shape may have a smaller or larger range in vertical and/or horizontal dimensions. The usable part of each 3D shape 1158*a-d* (e.g., sphere) may be projected to the common 3D shape (e.g., common sphere) for each 3D shape 1158*a-d*.

FIG. 12 is a diagram illustrating an example of a common 3D shape 1256 being projected to a common plane 1272. For example, once all fisheye images (on 3D shapes enclosed by the common 3D shape 1256, for instance) are projected to the common 3D shape (e.g., common sphere), the fisheye images may be re-projected from the common 3D shape (e.g., common sphere) to a common plane 1272. The example illustrated in FIG. 12 is a side view of the common 3D shape 1256 and the common plane 1272. For example, the common 3D shape 1256 illustrated in FIG. 12 may be an example of one or more of the common 3D shapes 856, 956, 1056, 1156 described in connection with one or more of FIGS. 8-11. In some configurations, the common plane 1272 may be parallel (or approximately parallel) to the ground. FIG. 12 shows an example of projection from the north pole 1274 of the common 3D shape 1256 (e.g., common sphere) to the common plane 1272 (e.g., ground). For example, an uppermost point of a common 3D shape (e.g., an uppermost centered point of a common 3D shape) may be used as a projection origination point in some configurations. In FIG. 12, P is a point on the common sphere, and P' is a projected point on the common plane 1272.

In some configurations, the fisheye images projected on the common plane 1272 may be aligned and/or stitched to obtain (e.g., generate) a combined view (e.g., large FOV surround view). In some configurations, the image on the common plane 1272 may be projected to a 3D shape (e.g., back to the sphere) to get a 3D combined view (e.g., surround view).

FIG. 13 is a flow diagram illustrating a more specific configuration of a method 1300 for producing a combined view. In particular, FIG. 13 illustrates one example of a method 1300 for generating a combined view (e.g., surround view) from fisheye cameras. The method 1300 may be performed by an electronic device (e.g., the electronic device 310 described in connection with FIG. 3).

The electronic device 310 may calibrate 1302 the fisheye cameras. The calibration may be performed with any calibration approach that may ensure that the fisheye image can be projected to a 3D shape (e.g., sphere). For example, an equidistant fisheye model may be used, which can be represented by a focal length f and an image center (x0, y0).

In some configurations, the following approach may be utilized to estimate parameters for the 3D shapes (e.g., spheres). In order to estimate an image center (x0, y0), the electronic device 310 may take sample points along the circle boundary of the fisheye image (e.g., each of the fisheye images). The electronic device 310 may use the positions of these points to approximate a circle. The center of the estimated circle may be (x0, y0). The electronic device 310 may also estimate the radius of the circle from the estimated circle. Additionally, for focal length f, if the FOV of the fisheye camera is known, such as 180 degrees, then f*theta=radius of circle. Accordingly, the electronic device 310 may determine the radius of the circle as described above and theta may be an angle (e.g., a radian representation of 180/2 degrees or Pi/2). The electronic device 310 may then determine the focal length.

The electronic device 310 may obtain fisheye images from a plurality of fisheye cameras. This may be accomplished as described above in connection with one or more of FIGS. 3-4, for example.

The electronic device 310 may project 1304 each fisheye image to a respective 3D shape (e.g., sphere) for each fisheye camera. This may be accomplished as described in connection with one or more of FIGS. 3-4 and 7. For example, each fisheye image from the fisheye cameras may be projected 1304 to its own 3D shape (e.g., sphere). For instance, each fisheye lens may be modeled by a sphere. Accordingly, each fisheye image may be projected 1304 to a 3D shape (e.g., sphere) that is determined by corresponding calibration parameters.

The electronic device 310 may rotate 1306 at least one 3D shape to compensate for a tilt of a corresponding fisheye camera. This may be accomplished as described in accordance with one or more of FIGS. 3 and 5-7. For example, one or more of the 3D shapes (e.g., spheres) may be rotated to compensate for the tilt of the fisheye cameras. In some implementations, the cameras may be installed with different tilt angles. For example, a front camera may point upward, while other cameras may point downward. One or more fisheye images corresponding to one or more fisheye cameras may be un-tilted by rotating the 3D shape (e.g., sphere) such that each camera has the same or substantially the same tilt angle.

The electronic device 310 may rotate 1308 at least one 3D shape to approximately align a corresponding fisheye image to a direction. This may be accomplished as described in connection with one or more of FIGS. 3 and 7. For example, one or more of the 3D shapes (e.g., spheres) may be rotated 1308 to correct the direction of the fisheye images. When the fisheye images are projected to a 3D shape (e.g., sphere), for instance, they may initially point to the same direction. Accordingly, one or more fisheye images (e.g., 3D shape, sphere, etc.) may be rotated such that each fisheye image points to a correct direction. For a projected fisheye image corresponding to a front camera, for example, may be rotated 1308 such that it is directed to the front of a common 3D shape (e.g., common sphere). In some configurations, the tilt and/or direction misalignment (e.g., pointing error) may be predetermined and/or evaluated before runtime. For example, the error may be manually predetermined and/or the error may be evaluated beforehand.

The electronic device 310 may project 1310 at least a portion of each 3D shape to a common 3D shape (e.g., common sphere). This may be accomplished as described in connection with one or more of FIGS. 3 and 8-11. In some configurations, the common 3D shape may enclose all of the 3D shapes. For example, each individual 3D shape (e.g., sphere) for each fisheye camera may be projected 1310 to a common 3D shape (e.g., common sphere) enclosing all individual 3D shapes (e.g., spheres) for the fisheye cameras.

The electronic device 310 may project 1312 (e.g., re-project) at least a portion of the common 3D shape (e.g., fisheye images on the common sphere) to a common plane. This may be accomplished as described in connection with one or more of FIGS. 3 and 12. In some configurations, the common plane may be approximately parallel to the ground. Any projection approach may be used. For example, a stereographic projection may be used to project each image on the common 3D shape (e.g., sphere) to the common plane. In some approaches, the projection 1312 may be from a north pole of the common plane (e.g., common sphere) to the common plane that is approximately parallel to the ground.

The electronic device 310 may align 1314 the fisheye images. For example, the electronic device 310 may align 1314 the fisheye images with each other (e.g., with adjacent fisheye images) for the fisheye images that have been projected to the common plane. This may be accomplished as described in connection with one or more of FIGS. 3, 10, and 12. In some configurations, an affine transform may be applied to align the fisheye images projected onto the common plane. For example, the images on the common plane may be translated and/or scaled to match the overlapping regions. Additionally or alternatively, a projective transform and/or image morphing between fisheye images may be used.

The electronic device 310 may determine an alignment error. In some configurations, the alignment error may be determined based on how closely the pixels match between overlapping regions. For example, the electronic device 310 may compute a correlation between the pixels of the overlapping regions. One or more correlations may be computed before, during, and/or after alignment 1314. The alignment error may be indicated by (e.g., inversely proportional to) the correlation between the overlapping regions or a value (e.g., score) based on the correlation between the overlapping regions. For example, the higher the correlation, the lower the alignment error.

In some configurations, the alignment error may be additionally or alternatively based on feature matching. For example, there may be patterns and/or features in the overlapping regions. The electronic device 310 may determine one or more features (e.g., keypoints, feature vectors, etc.) in the overlapping regions. For instance, aligning 1314 the fisheye images may include determining the features. The alignment error (e.g., score) may be indicated by (e.g., inversely proportional to) the degree of feature matching between the overlapping regions. For example, the alignment error may be based on a correlation of features (e.g., feature vectors), distances between features (e.g., keypoints), etc.

The electronic device 310 may determine 1316 whether an alignment error is too large. For example, the electronic device 310 may determine 1316 whether an alignment error exceeds a predetermined threshold. If the alignment error is too large (e.g., if the alignment error is not small enough, if the alignment error exceeds the predetermined threshold, etc.), the electronic device 310 may repeat or skip one or more operations (to adjust the alignment until the alignment error is smaller than a predefined threshold, for example). For instance, the electronic device 310 may project 1304 each fisheye image to a respective 3D shape, rotate 1306 at least one 3D shape to compensate for tilt, rotate 1308 at least one 3D shape to align a fisheye image to a direction, project 1310 at least a portion of a 3D shape to a common 3D shape, project 1312 at least a portion of the common 3D shape to a common plane and/or align 1314 the fisheye images (as needed, for instance) to reduce the alignment error.

If the alignment error is not too large (e.g., if the alignment error is small enough, if the alignment error does not exceed the predetermined threshold, etc.), the electronic device 310 may determine 1318 at least one seam between adjacent fisheye images. For example, the electronic device 310 may select one or more seams for adjacent fisheye images trimming (e.g., cutting) and/or stitching the images. One or more of the seams may be good (e.g., the best seams) for trimming and/or stitching the fisheye images.

The electronic device 310 may trim 1320 at least one fisheye image based on the seam. For example, the electronic device 310 may trim (e.g., crop out, remove, etc.) a portion of a fisheye image that overlaps with an adjacent fisheye image and/or that is beyond the seam. For instance, a fisheye image may be cut along the seam. A part of the fisheye image may be kept in the final combined image (e.g., combined view, surround view, etc.), while one or more parts may be discarded. Trimmed (e.g., cropped out) image data may be discarded in some configurations. Additionally or alternatively, the electronic device 310 may stitch (e.g., combine, join, etc.) the images.

Generating a combined view may include aligning 1314 the fisheye images, determining 1318 at least one seam between adjacent fisheye images, trimming 1320 at least one fisheye image and/or stitching fisheye images. After generating the combined view (e.g., determining 1318 at least one seam, trimming 1320 at least one fisheye image and/or stitching fisheye images), in some configurations, the electronic device 310 may output the combined view (e.g., surround view). For example, the electronic device 310 may output the combined view to one or more displays and/or may send the combined view to another device. In some configurations, the electronic device 310 may store the combined view in memory. An example of the combined view (e.g., surround view) generation from fisheye cameras is shown in FIGS. 14-22.

Figure 14:
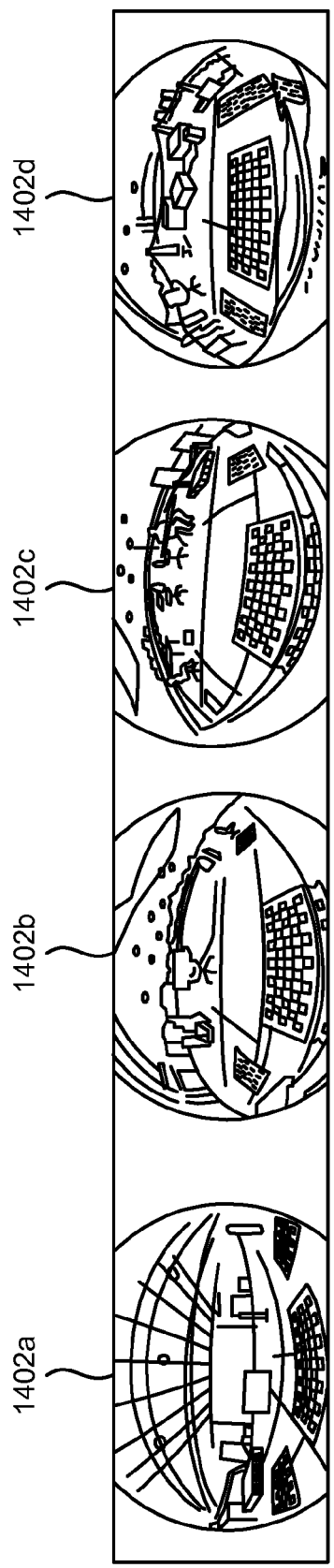
FIG. 14 illustrates an example of four input fisheye images from four fisheye cameras.

FIG. 14 illustrates an example of four input fisheye images from four fisheye cameras. In this example, in order from left to right, a first fisheye image 1402a corresponds to a front fisheye camera on a vehicle, a second fisheye image 1402b corresponds to a right fisheye camera on the vehicle, a third fisheye image 1402c corresponds to a left fisheye camera on the vehicle and a fourth fisheye image 1402d corresponds to a rear fisheye camera on the vehicle. The fisheye images 1402a-d may be obtained as described above in connection with one or more of FIGS. 1, 3-4 and 13.

Figure 15:
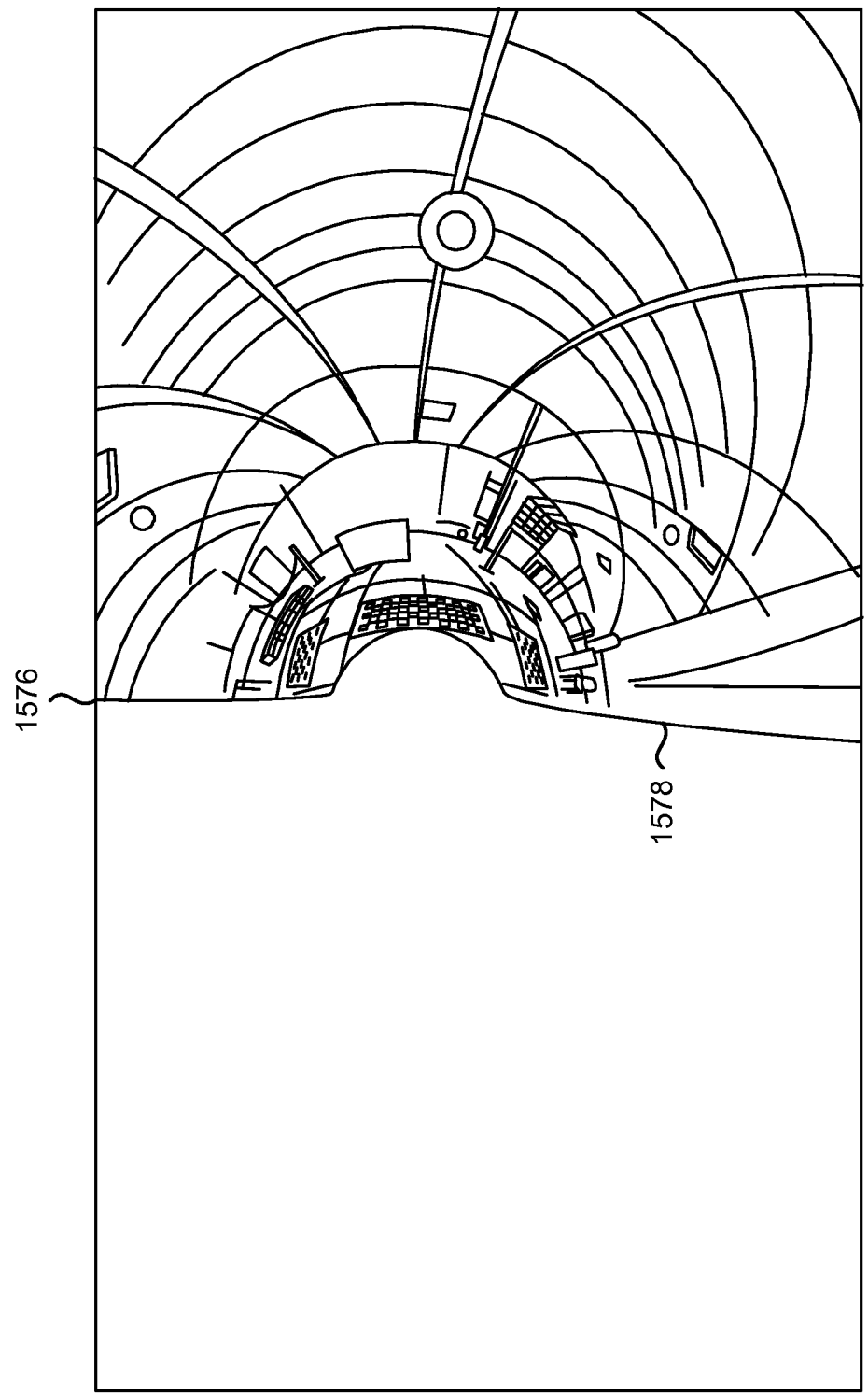
FIG. 15 illustrates an example of a fisheye image on a plane.

FIG. 15 illustrates an example of a fisheye image 1578 on a plane 1576. In this example, the first fisheye image 1402a (e.g., front fisheye camera image) from FIG. 14 has been projected to a sphere and then projected to a plane 1576 approximately parallel to a ground plane. As can be observed in FIG. 15, the fisheye image 1578 corresponding to the front fisheye camera has not been rotated to a front direction. Accordingly, the fisheye image 1578 faces to the right (rather than to the front for the front camera).

Figure 16:
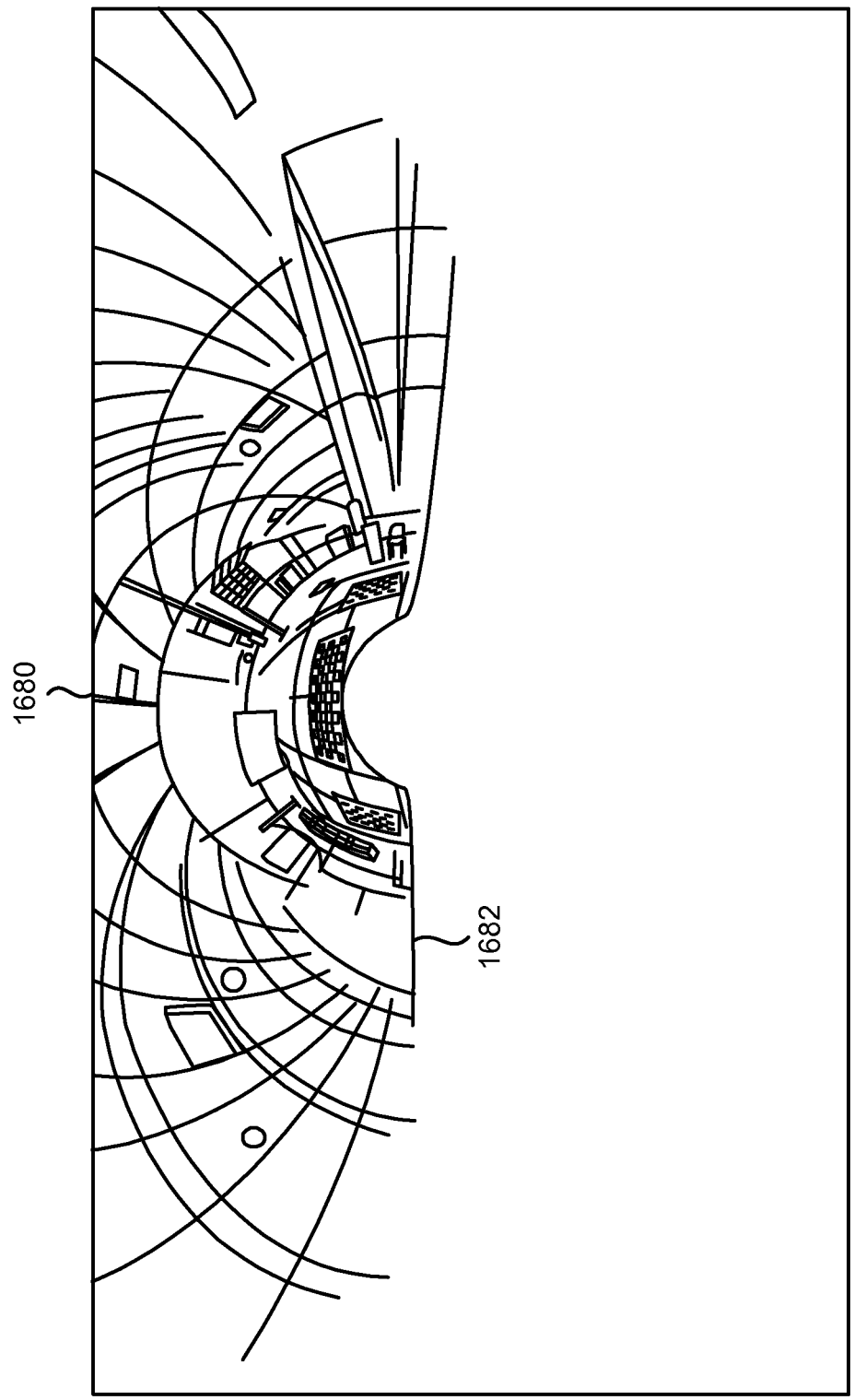
FIG. 16 illustrates another example of a fisheye image on a plane.

FIG. 16 illustrates another example of a fisheye image 1682 on a plane 1680. In this example, the first fisheye image 1402a (e.g., front fisheye camera image) from FIG. 14 was projected to an individual sphere. The individual sphere was then rotated 90 degrees (horizontally) to align the fisheye image 1682 to a front direction. The individual sphere was also rotated 15 degrees (vertically) to compensate for a tilt in the front fisheye camera. The individual sphere was projected to a common sphere. The fisheye image 1682 was then projected to the plane 1680. As can be observed, the fisheye image 1682 faces the front (corresponding to the front fisheye camera, for example).

Figure 17:
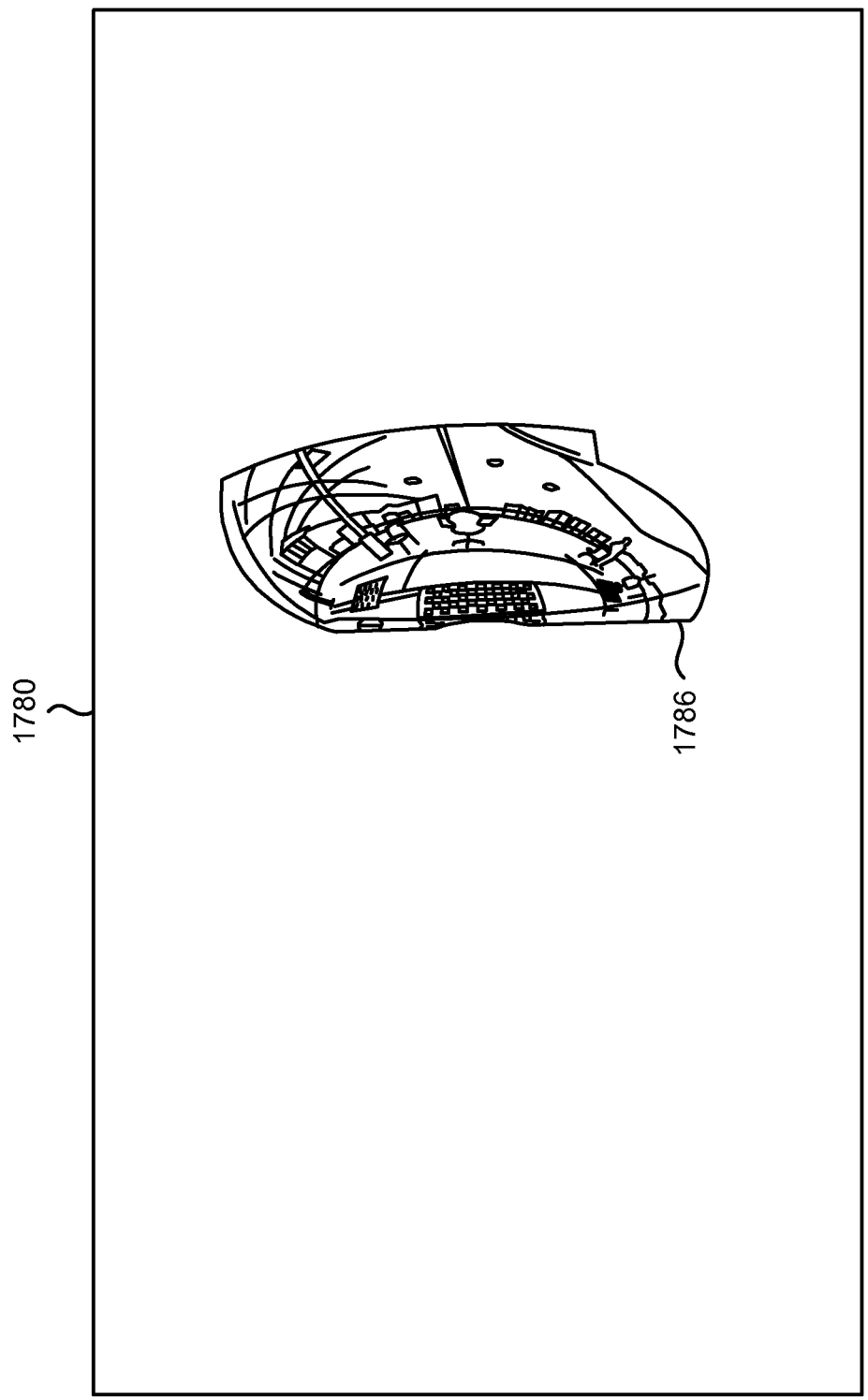
FIG. 17 illustrates another example of a fisheye image on a plane.

FIG. 17 illustrates another example of a fisheye image 1786 on a plane 1780. In this example, the second fisheye image 1402b (e.g., right fisheye camera image) from FIG. 14 was projected to an individual sphere. In this case, the individual sphere may not have been rotated to align to a direction (as the fisheye image 1786 may already face the correct direction, for instance), though the sphere may have been rotated to compensate for a tilt. The fisheye image 1786 was then projected to a common sphere and then projected to the plane 1780. In this example, the plane 1780 may be the same as the plane 1680 described in connection with FIG. 16 (e.g., a common plane).

Figure 18:
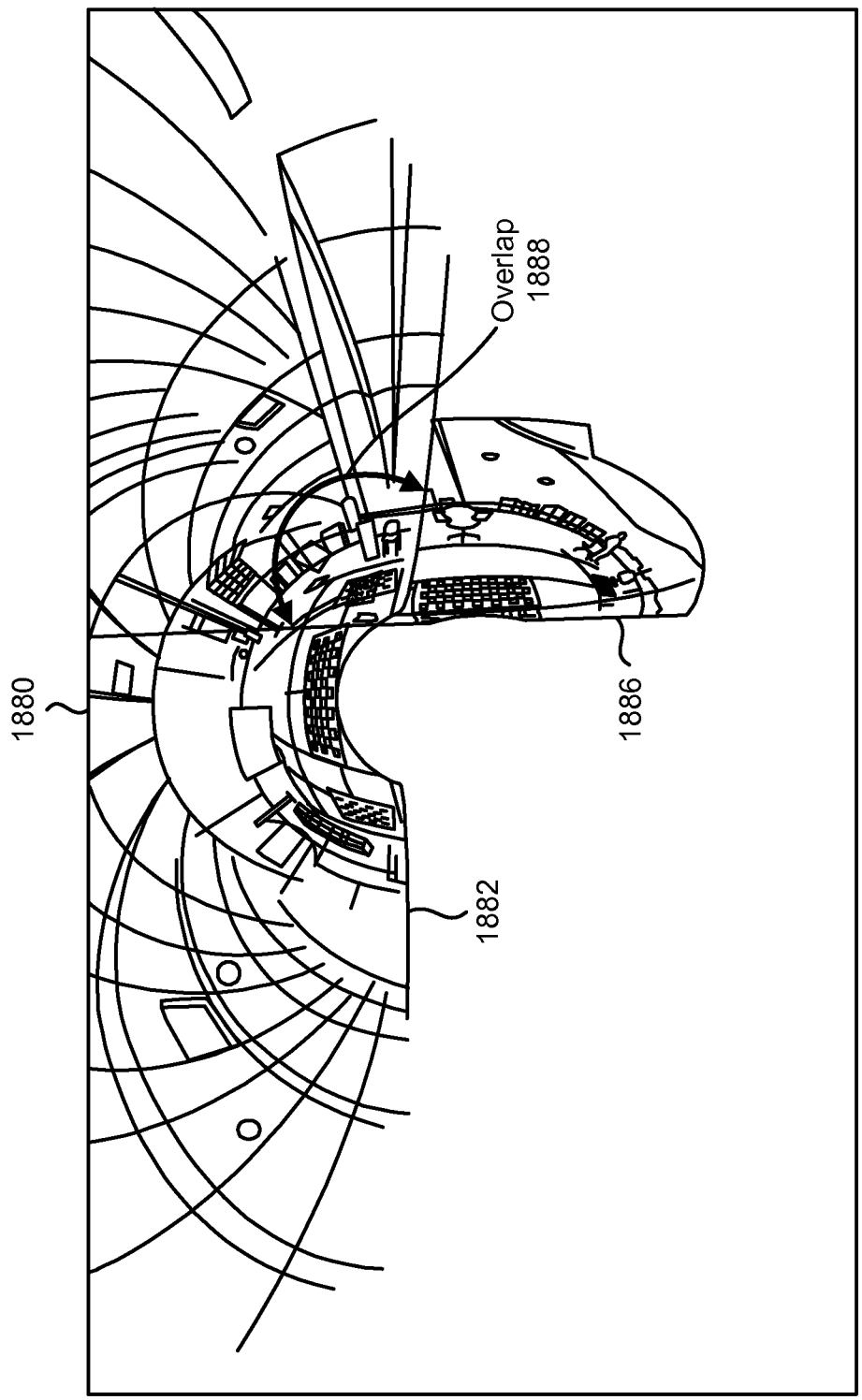
FIG. 18 illustrates an example of fisheye images on a common plane.

FIG. 18 illustrates an example of fisheye images 1882, 1886 on a common plane 1880. In this example, both the first fisheye image 1402a (e.g., front fisheye camera image) and the second fisheye image 1402b (e.g., right fisheye camera image) from FIG. 14 were projected to the common plane 1880 as described in connection with FIGS. 16-17. Accordingly, corresponding fisheye images 1882, 1886 are illustrated on a common plane 1880. The fisheye images 1882, 1886 were also aligned. As can be observed in FIG. 18, an overlap 1888 exists between the fisheye images 1882, 1886.

Figure 19:
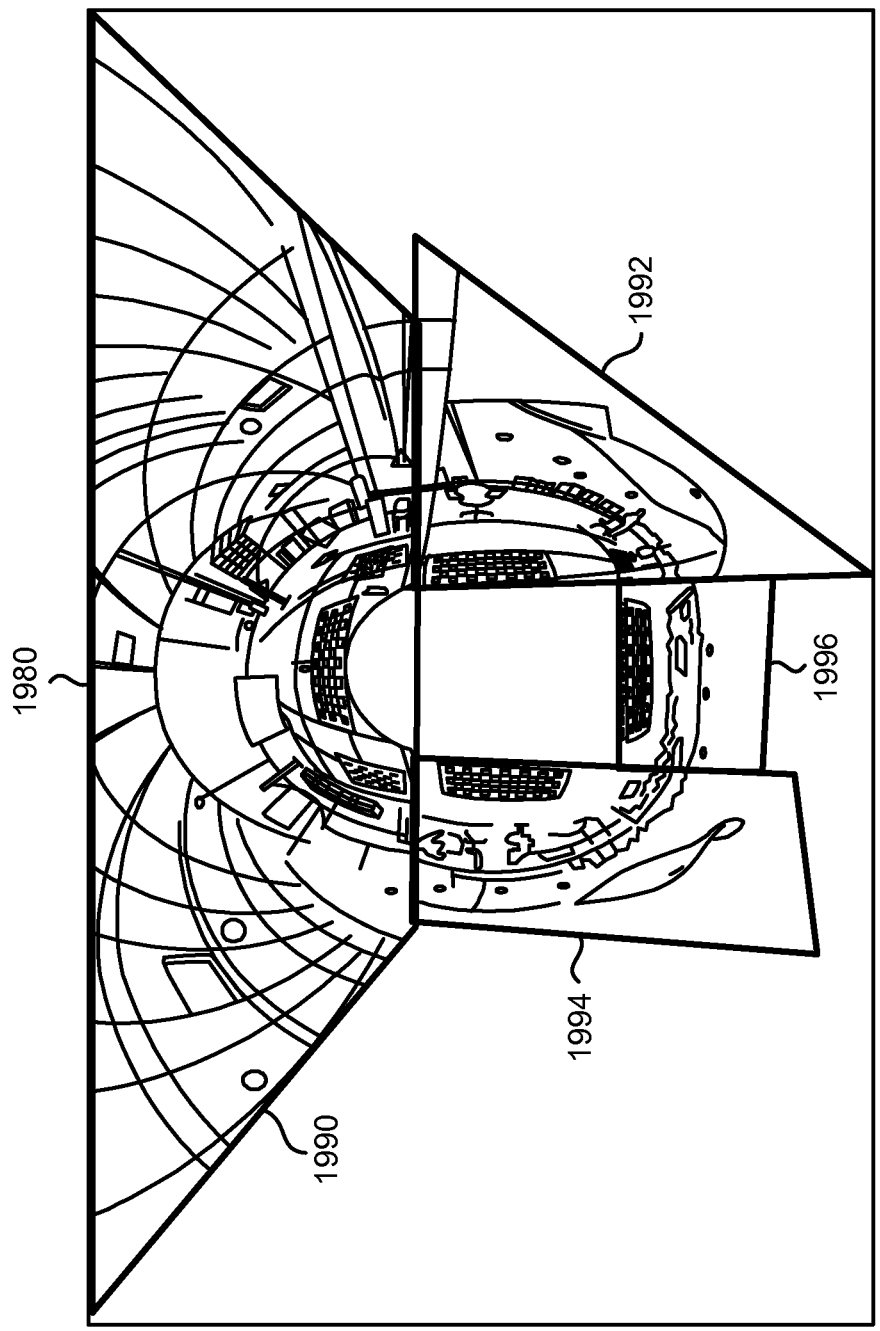
FIG. 19 illustrates another example of fisheye images on a common plane.

FIG. 19 illustrates another example of fisheye images 1990, 1992, 1994, 1996 on a common plane 1980. In this example, the first fisheye image 1402a (e.g., front fisheye camera image), the second fisheye image 1402b (e.g., right fisheye camera image), the third fisheye image 1402c (e.g., left fisheye camera image) and the fourth fisheye image 1402d (e.g., rear fisheye camera image) from FIG. 14 were projected to the common plane 1980. Accordingly, corresponding fisheye images 1990, 1992, 1994, 1996 are illustrated on a common plane 1980. One or more of the fisheye images 1990, 1992, 1994, 1996 may have been adjusted (e.g., rotated to align to a direction and/or rotated to compensate for tilt). The fisheye images 1990, 1992, 1994, 1996 were also aligned, trimmed and stitched. As can be observed in FIG. 19, only portions of each fisheye image 1990, 1992, 1994, 1996 are kept or remain.

Figure 20:
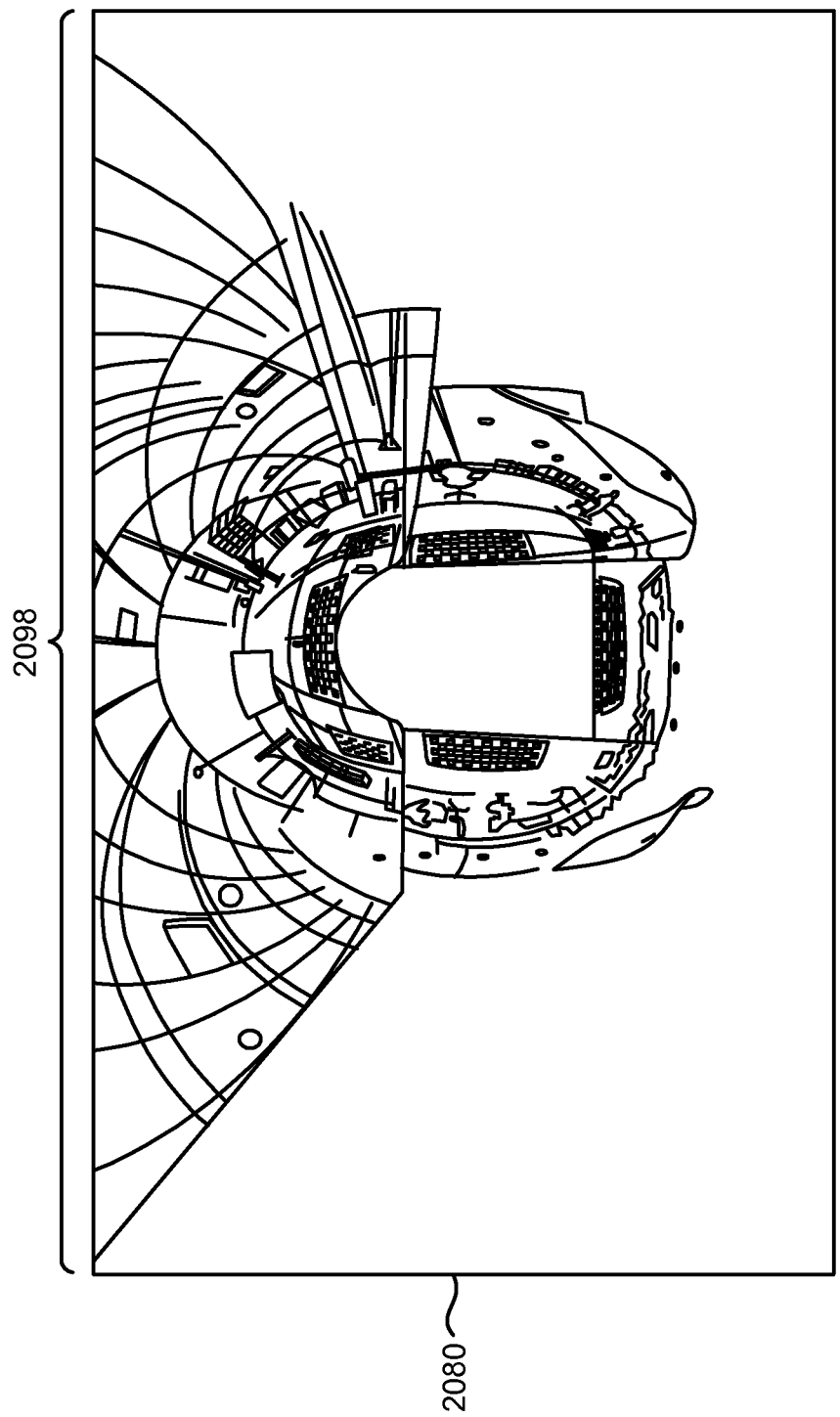
FIG. 20 illustrates an example of a combined view on a common plane.

FIG. 20 illustrates an example of a combined view (e.g., surround view) 2098 on a common plane 2080. In this example, a top-down 360-degree combined view 2098 on the common plane 2080 may be the resulting image from the procedures described in connection with FIGS. 14 and 16-19.

Figure 21:
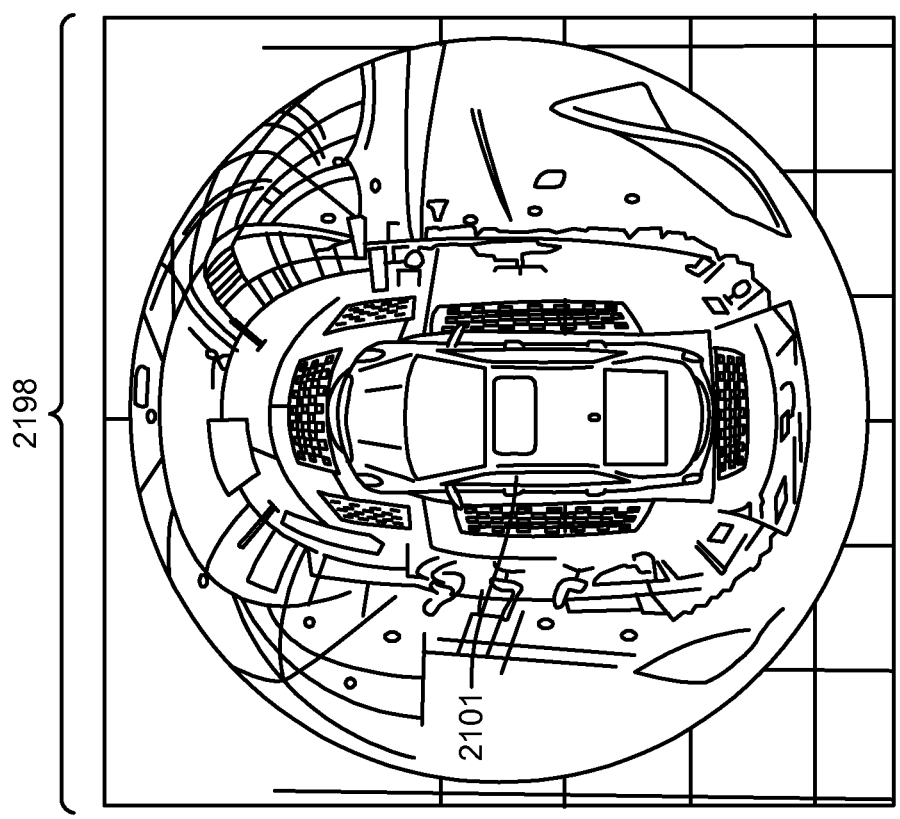
FIG. 21 illustrates another example of a combined view.

FIG. 21 illustrates another example of a combined view 2198. In this example, the combined view 2098 of FIG. 20 has been further cropped and a vehicle image 2101 (e.g., a model) has been inserted to produce the combined view 2198. For example, a vehicle may be depicted as a model or representation of an actual vehicle in the combined view 2098. It should be noted that a combined view may be cropped in other shapes.

Figure 22:
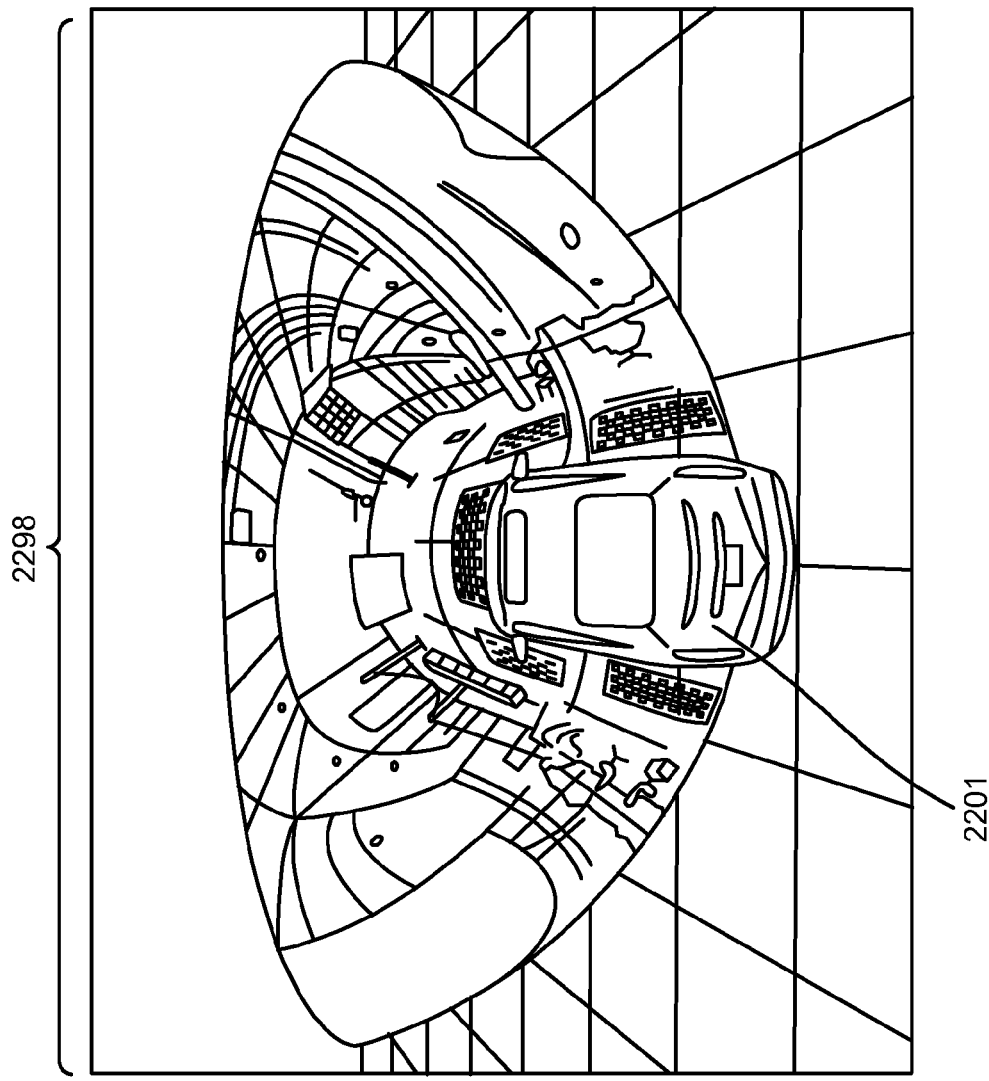
FIG. 22 illustrates another example of a combined view.

FIG. 22 illustrates another example of a combined view 2298. In this example, the combined view 2098 of FIG. 20 has been projected to a hemiellipsoidal shape to provide a 3D view effect. Additionally, the combined view 2098 of FIG. 20 has been cropped to remove a rear view portion and a vehicle image 2201 (e.g., a model) has been inserted to produce the combined view 2198. Moreover, a viewpoint of the combined view 2298 is at an oblique angle above and behind the vehicle in this example.

Figure 23:
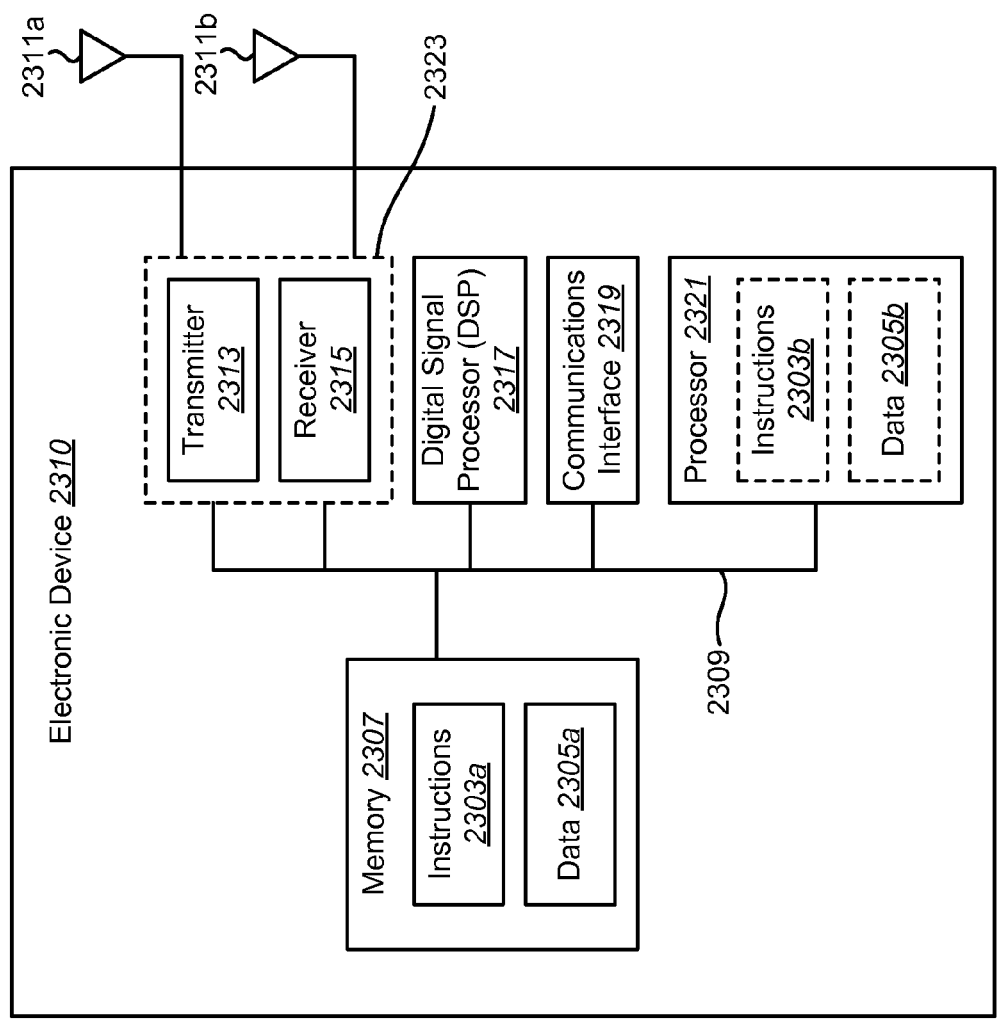
FIG. 23 illustrates certain components that may be included within an electronic device configured to implement various configurations of the systems and methods disclosed herein.

FIG. 23 illustrates certain components that may be included within an electronic device 2310 configured to implement various configurations of the systems and methods disclosed herein. Examples of the electronic device 2310 may include cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart applications, healthcare equipment, gaming consoles, personal digital assistants (PDAs), set-top boxes, etc. The electronic device 2310 may be implemented in accordance with the electronic device 310 described in connection with FIG. 3. The electronic device 2310 includes a processor 2321. The processor 2321 may be a general purpose single- or multi-chip microprocessor (e.g., an ARM), a special purpose microprocessor (e.g., a digital signal processor (DSP)), a microcontroller, a programmable gate array, etc. The processor 2321 may be referred to as a central processing unit (CPU). Although just a single processor 2321 is shown in the electronic device 2310, in an alternative configuration, a combination of processors (e.g., an ARM and DSP) could be implemented.

The electronic device 2310 also includes memory 2307. The memory 2307 may be any electronic component capable of storing electronic information. The memory 2307 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 2305a and instructions 2303a may be stored in the memory 2307. The instructions 2303a may be executable by the processor 2321 to implement one or more of the methods (e.g., method 400, method 1300), procedures, steps, and/or functions described herein. Executing the instructions 2303a may involve the use of the data 2305a that is stored in the memory 2307. When the processor 2321 executes the instructions 2303, various portions of the instructions 2303b may be loaded onto the processor 2321 and/or various pieces of data 2305b may be loaded onto the processor 2321.

The electronic device 2310 may also include a transmitter 2313 and a receiver 2315 to allow transmission and reception of signals to and from the electronic device 2310. The transmitter 2313 and receiver 2315 may be collectively referred to as a transceiver 2323. One or more antennas 2311a-b may be electrically coupled to the transceiver 2323. The electronic device 2310 may also include (not shown) multiple transmitters, multiple receivers, multiple transceivers and/or additional antennas.

The electronic device 2310 may include a digital signal processor (DSP) 2317. The electronic device 2310 may also include a communication interface 2319. The communication interface 2319 may allow and/or enable one or more kinds of input and/or output. For example, the communication interface 2319 may include one or more ports and/or communication devices for linking other devices to the electronic device 2310. In some configurations, the communication interface 2319 may include the transmitter 2313, the receiver 2315, or both (e.g., the transceiver 2323). Additionally or alternatively, the communication interface 2319 may include one or more other interfaces (e.g., touchscreen, keypad, keyboard, microphone, camera, etc.). For example, the communication interface 2319 may enable a user to interact with the electronic device 2310.

The various components of the electronic device 2310 may be coupled together by one or more buses, which may include a power bus, a control signal bus, a status signal bus, a data bus, etc. For the sake of clarity, the various buses are illustrated in FIG. 23 as a bus system 2309.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic device, comprising:
a processor configured to:
obtain images from a plurality of cameras;
project each image to a respective 3-dimensional (3D) shape used to model each camera; and
generate a combined view based on the projected images.

2. The electronic device of claim 1, wherein the processor is configured to rotate at least one of the 3D shapes to approximately align a corresponding image to a direction.

3. The electronic device of claim 1, wherein the processor is configured to rotate at least one of the 3D shapes to compensate for a tilt of a corresponding camera.

4. The electronic device of claim 1, wherein the processor is configured to project at least a portion of each 3D shape to a common 3D shape enclosing all 3D shapes associated with the cameras.

5. The electronic device of claim 4, wherein the processor is configured to project at least a portion of the common 3D shape to a common plane.

6. The electronic device of claim 5, wherein the processor is configured to project the common 3D shape from a north pole of the common 3D shape to the common plane, wherein the common plane is approximately parallel to ground.

7. The electronic device of claim 5, wherein the processor is configured to align the images projected to the common plane.

8. The electronic device of claim 7, wherein the processor is configured to determine whether an alignment error exceeds a predetermined threshold.

9. The electronic device of claim 7, wherein the processor is configured to determine at least one seam between adjacent images and trim the images to produce a combined image.

10. The electronic device of claim 9, wherein the processor is configured to project the combined image to a shape.

11. The electronic device of claim 9, wherein the cameras are installed in a vehicle and the processor is configured to present the combined view in the vehicle.

12. The electronic device of claim 1, wherein the images are wide-angle images and the cameras are wide-angle cameras.

13. A method, comprising:
obtaining images from a plurality of cameras;
projecting each image to a respective 3-dimensional (3D) shape used to model each camera; and
generating a combined view based on the projected images.

14. The method of claim 13, further comprising:
rotating at least one of the 3D shapes to approximately align a corresponding image to a direction.

15. The method of claim 13, further comprising:
rotating at least one of the 3D shapes to compensate for a tilt of a corresponding camera.

16. The method of claim 13, further comprising:
projecting at least a portion of each 3D shape to a common 3D shape enclosing all 3D shapes associated with the cameras.

17. The method of claim 16, further comprising:
projecting at least a portion of the common 3D shape to a common plane.

18. The method of claim 17, wherein the common 3D shape is projected from a north pole of the common 3D shape to the common plane, wherein the common plane is approximately parallel to ground.

19. The method of claim 17, wherein generating the combined view comprises aligning the images projected to the common plane.

20. The method of claim 19, wherein generating the combined view comprises:
   determining at least one seam between adjacent images; and
   trimming the images to produce a combined image.

21. The method of claim 20, wherein generating the combined view comprises projecting the combined image to a shape.

22. The method of claim 20, wherein the cameras are installed in a vehicle and the combined view is presented in the vehicle.

23. A computer-program product, comprising a non-transitory tangible computer-readable medium having instructions thereon, the instructions comprising:
   code for causing an electronic device to obtain images from a plurality of cameras;
   code for causing the electronic device to project each image to a respective 3-dimensional (3D) shape used to model each camera; and
   code for causing the electronic device to generate a combined view based on the projected images.

24. The computer-program product of claim 23, further comprising code for causing the electronic device to rotate at least one of the 3D shapes to approximately align a corresponding image to a direction.

25. The computer-program product of claim 23, further comprising code for causing the electronic device to rotate at least one of the 3D shapes to compensate for a tilt of a corresponding camera.

26. The computer-program product of claim 23, further comprising code for causing the electronic device to project at least a portion of each 3D shape to a common 3D shape enclosing all 3D shapes associated with the cameras.

27. An apparatus, comprising:
   means for obtaining images from a plurality of cameras;
   means for projecting each image to a respective 3-dimensional (3D) shape used to model each camera; and
   means for generating a combined view based on the projected images.

28. The apparatus of claim 27, further comprising means for rotating at least one of the 3D shapes to approximately align a corresponding image to a direction.

29. The apparatus of claim 27, further comprising means for rotating at least one of the 3D shapes to compensate for a tilt of a corresponding camera.

30. The apparatus of claim 27, further comprising means for projecting at least a portion of each 3D shape to a common 3D shape enclosing all 3D shapes associated with the cameras.

* * * * *